(12) United States Patent
Nakamura

(10) Patent No.: US 10,809,948 B2
(45) Date of Patent: Oct. 20, 2020

(54) PREVIEW SCREEN DISPLAY APPARATUS, PREVIEW SCREEN DISPLAY METHOD, AND PREVIEW SCREEN DISPLAY PROGRAM

(71) Applicant: Sharp Kabushiki Kaisha, Sakai, Osaka (JP)

(72) Inventor: Hiroaki Nakamura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 15/632,507

(22) Filed: Jun. 26, 2017

(65) Prior Publication Data

US 2018/0004461 A1 Jan. 4, 2018

(30) Foreign Application Priority Data

Jun. 30, 2016 (JP) .................................. 2016-129779

(51) Int. Cl.
| | |
|---|---|
| *G06F 3/12* | (2006.01) |
| *G03G 15/00* | (2006.01) |
| *G06F 3/0482* | (2013.01) |
| *G06F 3/0484* | (2013.01) |
| *H04N 1/00* | (2006.01) |

(52) U.S. Cl.
CPC ......... *G06F 3/1208* (2013.01); *G03G 15/502* (2013.01); *G06F 3/0482* (2013.01); *G06F 3/0484* (2013.01); *G06F 3/1256* (2013.01); *H04N 1/00018* (2013.01)

(58) Field of Classification Search
CPC .... G06F 3/1208; G06F 3/0482; G06F 3/0484; G06F 3/1256; G03G 15/502
See application file for complete search history.

(56) References Cited

U.S. PATENT DOCUMENTS

| 8,649,031 | B2 * | 2/2014 | Kimura | .............. | H04N 1/00411 |
| | | | | | 358/1.13 |
| 2007/0081740 | A1 * | 4/2007 | Ciudad | .............. | H04N 1/00461 |
| | | | | | 382/276 |
| 2007/0250785 | A1 * | 10/2007 | Nakamura | ......... | H04N 1/00474 |
| | | | | | 715/764 |
| 2010/0188679 | A1 * | 7/2010 | Nakagawa | ......... | H04N 1/00448 |
| | | | | | 358/1.12 |
| 2011/0279363 | A1 * | 11/2011 | Shoji | .................. | H04N 1/00411 |
| | | | | | 345/156 |
| 2012/0050776 | A1 * | 3/2012 | Fukumoto | .......... | G03G 15/5087 |
| | | | | | 358/1.13 |

(Continued)

FOREIGN PATENT DOCUMENTS

| CN | 101790019 A | 7/2010 |
| JP | 2004-029292 A | 1/2004 |

*Primary Examiner* — Benjamin O Dulaney
(74) *Attorney, Agent, or Firm* — Keating & Bennett, LLP

(57) ABSTRACT

A preview screen display apparatus for displaying a preview screen for printing includes a selection unit which selects a print setting function in accordance with an input from a user, a reading unit which reads preview images, and a preview display unit which performs simultaneous display of a plurality of display objects corresponding to a plurality of different settings and including the preview images on a same screen or performs switching display of the display objects upon accepting selecting operation by the user, regarding the print setting function selected by the selection unit.

8 Claims, 23 Drawing Sheets

(56) References Cited

U.S. PATENT DOCUMENTS

2014/0145987 A1* 5/2014 Nishimura ......... H04N 1/00413
                                                    345/173
2014/0320902 A1* 10/2014 Nakatani .............. G03G 15/502
                                                    358/1.15
2015/0242712 A1* 8/2015 Awano ............... H04N 1/00411
                                                    358/1.15

* cited by examiner

FIG. 10

PREVIEW SCREEN DISPLAY APPARATUS, PREVIEW SCREEN DISPLAY METHOD, AND PREVIEW SCREEN DISPLAY PROGRAM

BACKGROUND

1. Field

The present disclosure relates to a preview screen display apparatus, preview screen display method, and preview screen display program for displaying a preview.

2. Description of the Related Art

In recent years, there are multi-function printers with functions for forming an image on paper or the like, reading an image from paper or the like, copying an image, storing an image in a storage apparatus or the like, and transmitting and receiving an image to and from an external apparatus.

In a copying function among the functions included in a multi-function printer, an image reading apparatus as a functional unit for reading an image from paper or the like and an image forming apparatus as a functional unit for forming an image on paper or the like cooperate with each other. Here, in the multi-function printer, when an image read by the image reading apparatus is formed by the image forming apparatus on paper or the like, various print setting functions can be used.

Examples of various print setting functions can include a page combination function, a binding margin addition function, a frame erasure function, and a stapling function.

The page combination function is a function of printing a plurality of reduced pages on one paper sheet. For example, in the case of a four-page combination function, A4-sized pages are reduced to A6 size and printed on an A4-sized paper sheet for four-page printing.

The binding margin addition function is a function of providing a binding margin of, for example, several centimeters on the left side of a paper sheet and shifting a print position to the right to avoid the binding margin.

The frame erasure function is a function of erasing, for example, black frames on four sides included in a read image and changing frame portions into white.

A stapling function is a function of stapling a plurality of pages after image formation by a stapler in the finisher.

Meanwhile, many multi-function printers include a preview function. By using the preview function, with a print setting function being applied to an image read by the image reading apparatus, the print-setting-function-applied image to be formed on paper or the like by the image forming apparatus can be displayed on a screen. That is, the preview function provides a function of what you see is what you get (WYSIWYG) in the field of computers.

However, if a plurality of print setting functions are present, settings in the respective print setting functions are all reflected in one preview image. Therefore, it may not be easy to grasp how a specific print setting function of concern is reflected in an image displayed on a preview screen.

Moreover, although setting is normally performed for each print setting function, the screen displayed when setting is performed for each print setting function does not use a preview screen. Therefore, whether the setting is as intended may not be grasped through the screen.

Japanese Unexamined Patent Application Publication No. 2004-29292 discloses an image forming apparatus. In the image forming apparatus, for the purpose of providing a display that is easy to understand even for elderly people and beginners, allows various settings to be made with ease, and is easy to handle even for elderly people and weak-sighted people, for example, on an applied function screen for setting an applied function, only a screen regarding a "single-sheet combination function", which is one of applied functions, is displayed, with a character font of each item enlarged so as to be easily recognizable even for elderly people and weak-sighted people. Also, ancillary function description information 300a describing function details is displayed for each function, thereby allowing the function details to be easily understood even by elderly people and beginners.

However, in Japanese Unexamined Patent Application Publication No. 2004-29292, only a schematic view for each set value in the applied function is displayed. Therefore, print results to be brought by each set value in the applied function may not be grasped with ease.

Thus, it is desirable to provide a preview screen display apparatus, preview screen display method, and preview screen display program making it easy for a user to select a setting from a plurality of settings for the same print setting function.

SUMMARY

According to an aspect of the disclosure, there is provided a preview screen display apparatus for displaying a preview screen for printing, the preview screen display apparatus including a selection unit which selects a print setting function in accordance with an input from a user, a reading unit which reads at least one of preview images, and a preview display unit which performs simultaneous display of a plurality of display objects corresponding to a plurality of different settings and including the at least one of preview images on a same screen or performs switching display of the display objects upon accepting selecting operation by the user, regarding the print setting function selected by the selection unit.

According to another aspect of the disclosure, there is provided a preview screen display method for displaying a preview screen for printing, the preview screen display method including selecting a print setting function in accordance with an input from a user, reading at least one of preview images, and performing simultaneous display of a plurality of display objects corresponding to a plurality of different settings and including the at least one of preview images on a same screen or performing switching display of the display objects upon accepting selecting operation by the user, regarding the print setting function selected by the selecting.

According to still another aspect of the disclosure, there is provided a preview screen display program causing a computer to function as the preview screen display apparatus described above.

BRIEF DESCRIPTION OF THE DRAWINGS

FIG. 10 is a diagram of still another screen related to the page combination function displayed by the preview screen display apparatus of the first embodiment of the present disclosure;

DESCRIPTION OF THE EMBODIMENTS

In the following, embodiments of the present disclosure are described in detail with reference to the drawings.

Figure 1:
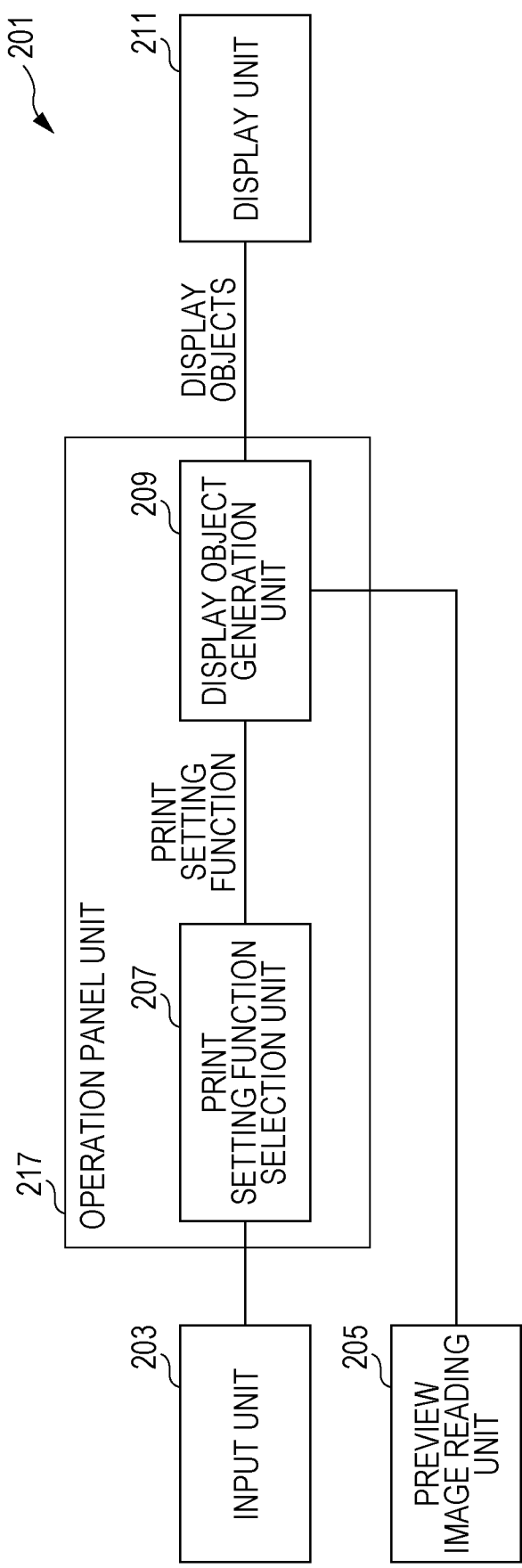
FIG. 1 is a block diagram of the structure of a preview screen display apparatus of an embodiment of the present disclosure.

FIG. 1 is a functional block diagram of a preview screen display apparatus 201 of an embodiment of the present disclosure.

With reference to FIG. 1, the preview screen display apparatus 201 of the present embodiment includes an input unit 203, a preview image reading unit 205, a print setting function selection unit 207, a display object generation unit 209, and a display unit 211.

Figure 2:
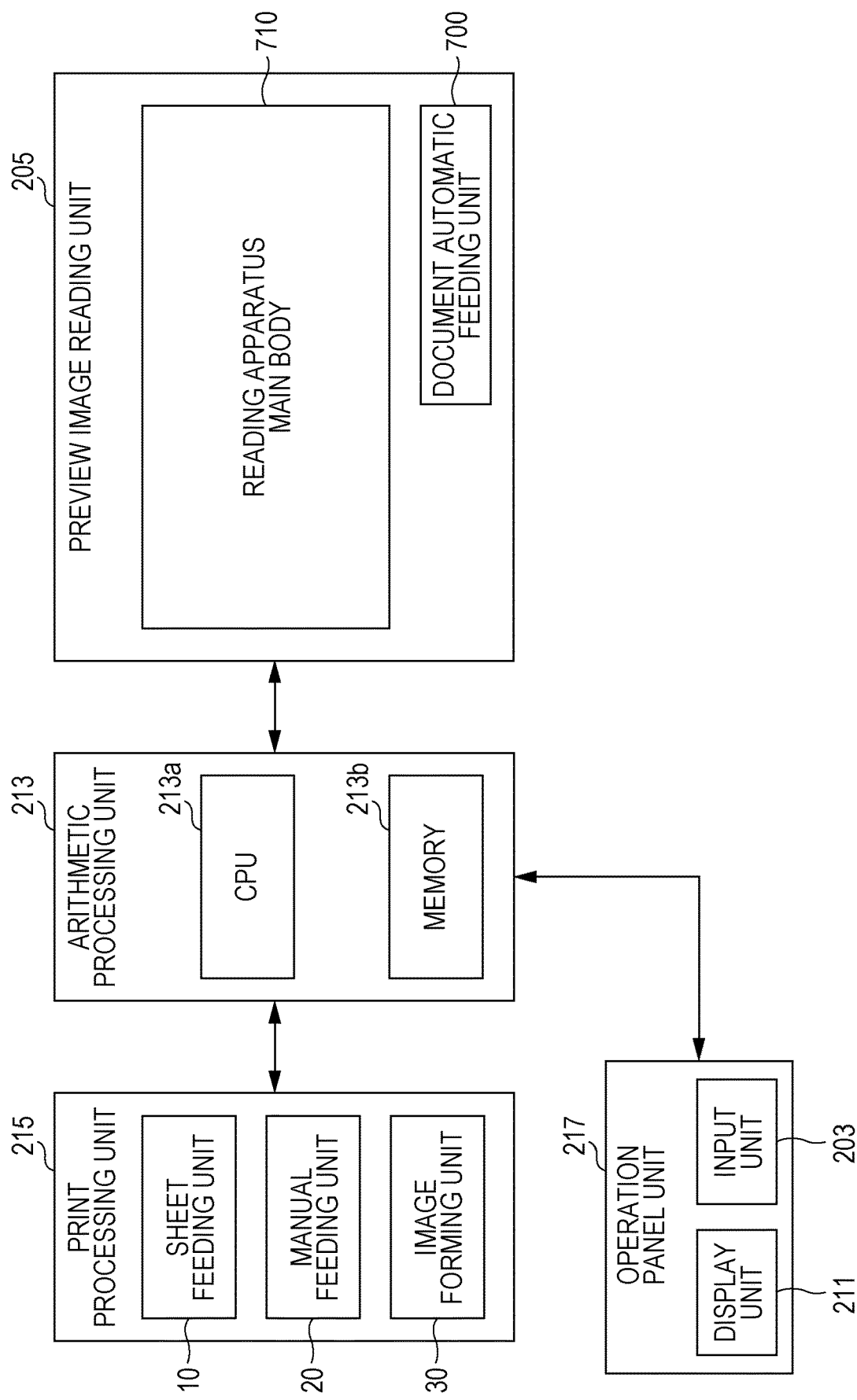
FIG. 2 is a block diagram of the structure of a multi-function printer according to an embodiment of the present disclosure.

The print setting function selection unit 207 and the display object generation unit 209 may be included in an arithmetic processing unit 213 (refer to FIG. 2). The input unit 203 and the display unit 211 may be integrated and included in an operation panel unit 217, as a touch-panel-equipped liquid-crystal display apparatus.

The input unit 203 includes various input keys and various input buttons by hardware or software, accepting operation from a user.

The preview image reading unit 205 is, for example, an image reading apparatus, and this is used also as an apparatus for reading preview images. The image reading apparatus scans a document with light in a main scanning direction and a sub-scanning direction to detect reflected light, thereby acquiring a secondary image from the document.

The print setting function selection unit 207 selects a print setting function in accordance with an input from the user.

Regarding the print setting function selected by the print setting function selection unit 207, the display object generation unit 209 may generate, on the same screen, a plurality of display objects corresponding to a plurality of different settings and including the preview images so that either ones of times and positions are identical to each other and the other ones are different from each other. Furthermore, the display object generation unit 209 may generate images including these display objects and may cause these images to be displayed on the display unit 211. Here, the display objects occupy a predetermined area on a screen and control a screen display method and operation.

Also, when the print setting function selection unit 207 selects a print setting function, if the preview image reading unit 205 has already read preview images, regarding the print setting function selected by the print setting function selection unit 207, the display object generation unit 209 may generate, on the same screen, a plurality of display objects corresponding to a plurality of different settings and including the preview images so that either ones of times and positions are identical to each other and the other ones are different from each other. Furthermore, the display object generation unit 209 may generate images including these display objects and cause these images to be displayed on the display unit 211.

Furthermore, when the print setting function selection unit 207 selects a print setting function, if the preview image reading unit 205 has not read preview images yet, regarding the print setting function selected by the print setting function selection unit 207, the display object generation unit 209 may generate, on the same screen, a plurality of display objects corresponding to a plurality of different settings and not including preview images so that either ones of times and positions are identical to each other and the other ones are different from each other. Furthermore, the display object generation unit 209 may generate images including these display objects and cause these images to be displayed on the display unit 211.

The display unit 211 displays various information, various images, and various figures. Note that these may be displayed in a form of display objects.

Next, a screen to be displayed by the preview screen display apparatus of the present disclosure is described.

Figure 3:
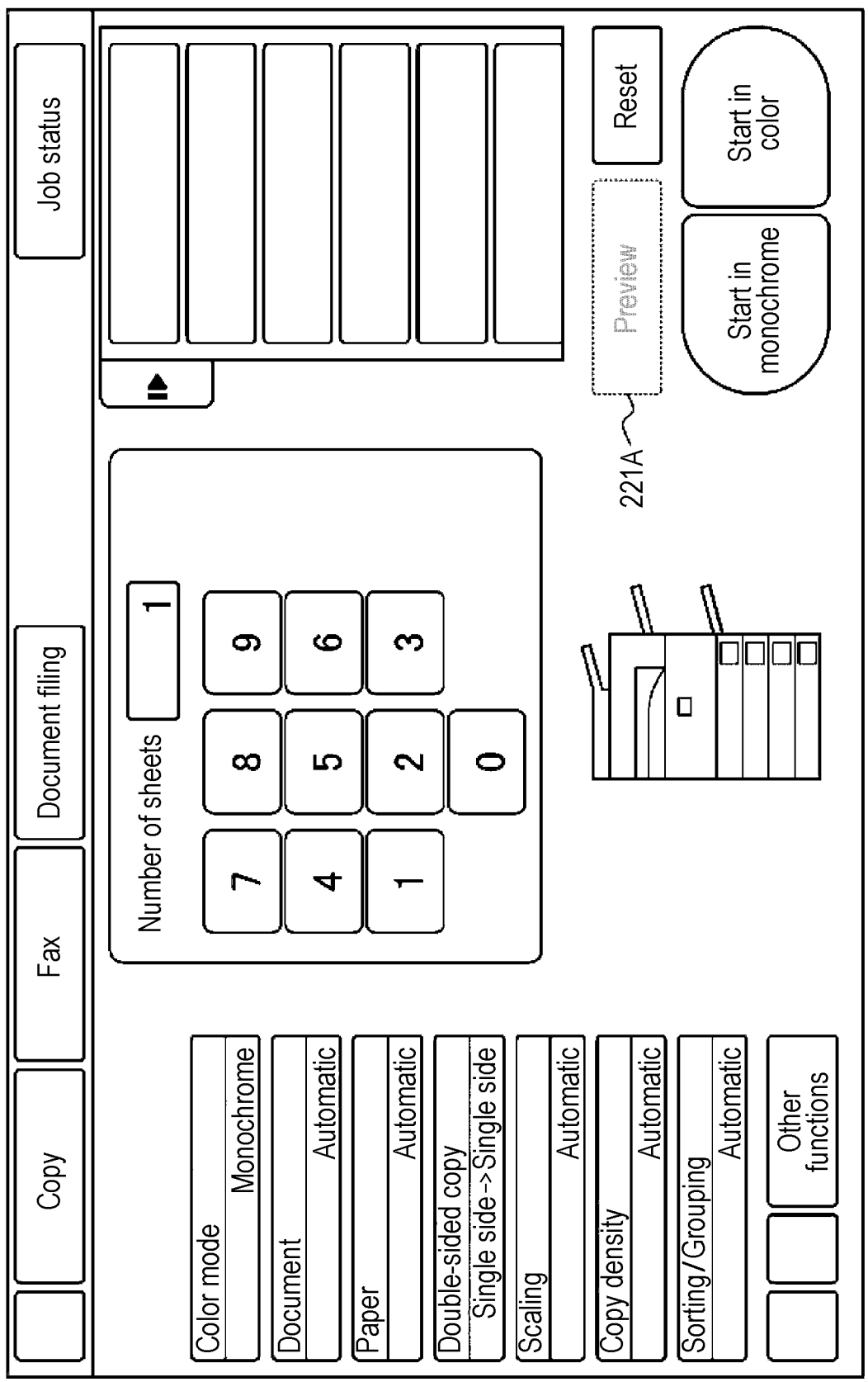
FIG. 3 is a diagram of an initial screen (preview disabled) displayed by the preview screen display apparatus of the embodiment of the present disclosure.

FIG. 3 depicts a user interface screen without a document set on a sheet loading unit 711 or a document automatic feeding unit 700. As depicted in FIG. 3, a Preview button 221A is grayed out and disabled.

Figure 4:
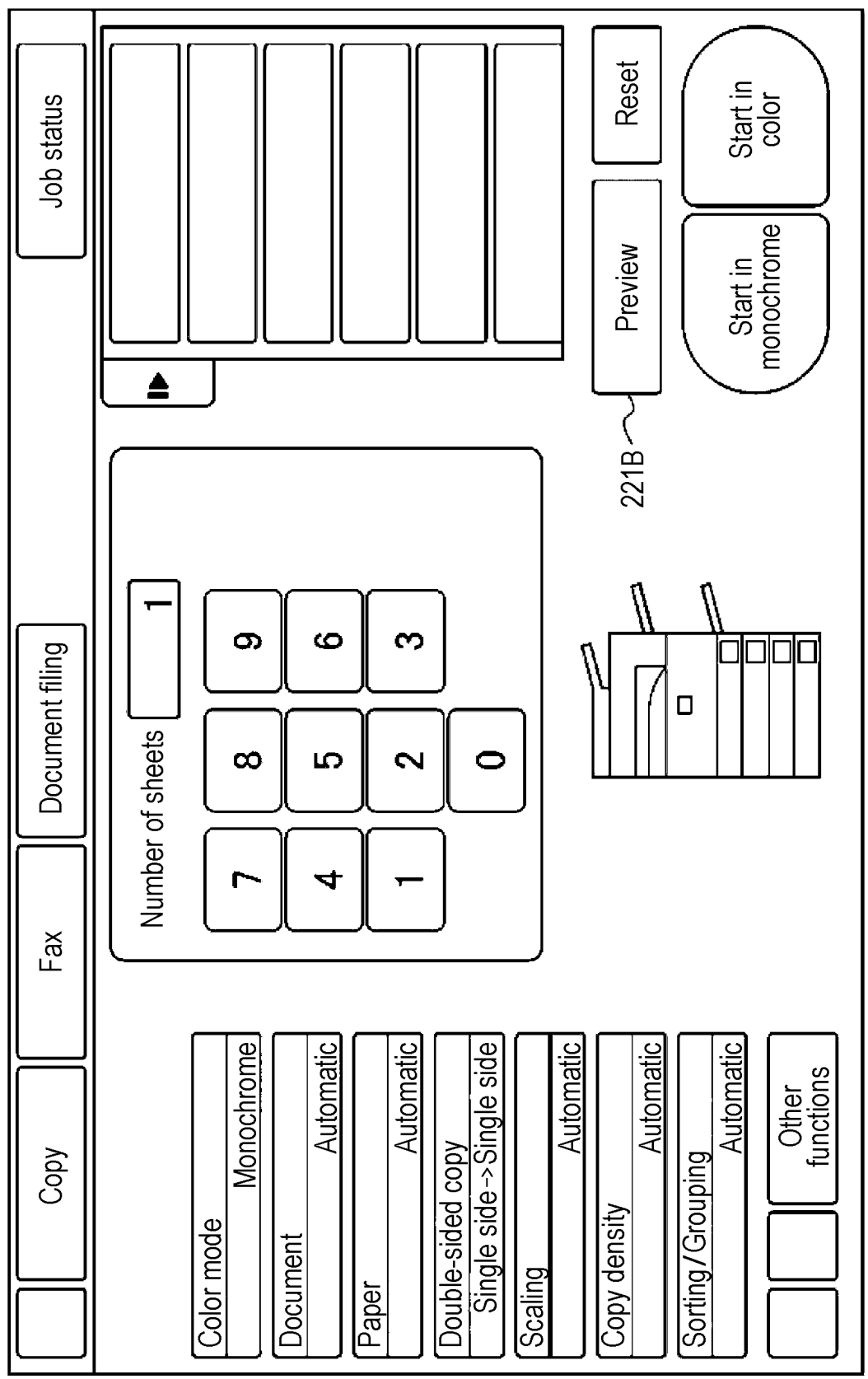
FIG. 4 is a diagram of an initial screen (preview enabled) displayed by the preview screen display apparatus of the embodiment of the present disclosure.

FIG. 4 depicts a user interface screen with a document set on the sheet loading unit 711 or the document automatic feeding unit 700. As depicted in FIG. 4, a Preview button 221B is on normal display and enabled. When the Preview button 221B is pressed by the user, the document is read by the preview image reading unit 205, and a preview image is acquired.

Figure 5:
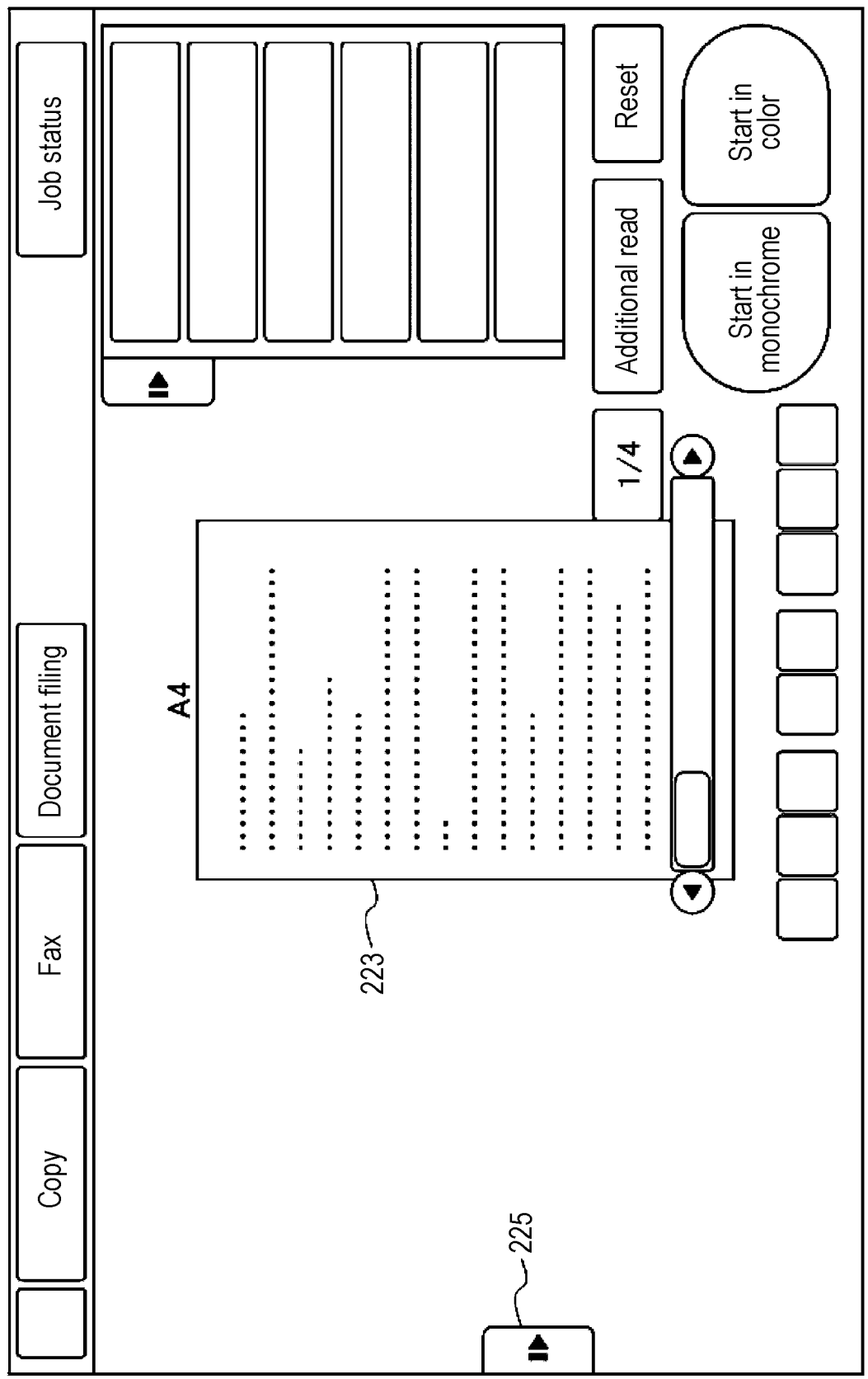
FIG. 5 is a diagram of a preview screen displayed by the preview screen display apparatus of the embodiment of the present disclosure.
Figure 6:
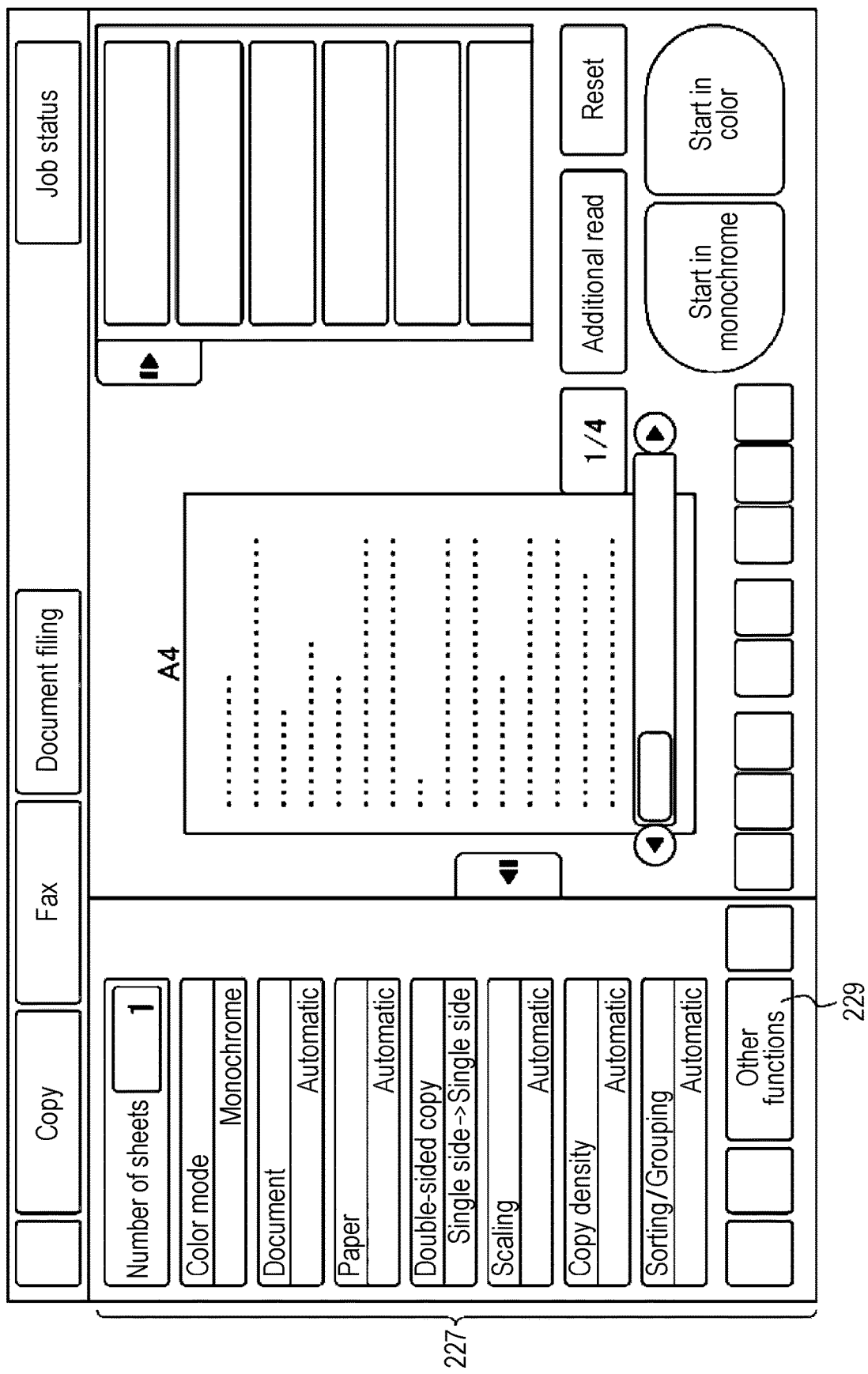
FIG. 6 is a diagram of the preview screen and a print setting function menu displayed by the preview screen display apparatus of the embodiment of the present disclosure.

FIG. 5 depicts a user interface screen including a preview display (large) 223 using the preview image after the document is read. On the screen depicted in FIG. 5, when a tab 225 is selected, as depicted in FIG. 6, a list 227 of print setting functions is displayed. The list 227 also includes an "Other functions" button 229 for selecting another print setting function not includable in the list 227 due to a limitation in the area of a region or the like.

Figure 7:
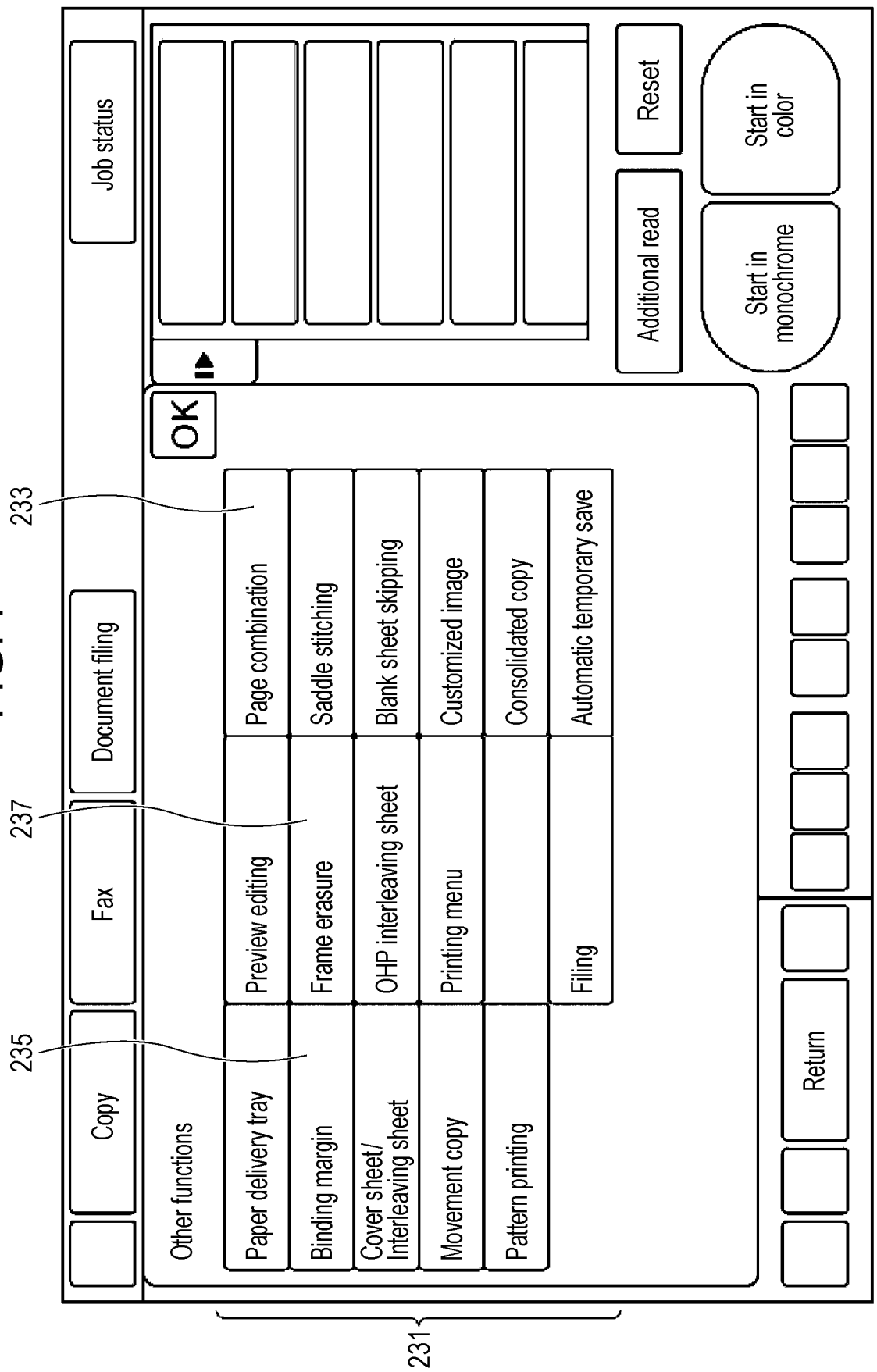
FIG. 7 is a diagram of another print setting function menu displayed by the preview screen display apparatus of the embodiment of the present disclosure.

When the "Other functions" button 229 is selected, as depicted in FIG. 7, a list 231 of other functions is displayed. This list 231 includes, for example, a "Page combination" button 233 for selecting a page combination function, a "Binding margin" button 235 for selecting a binding margin addition function, and a "Frame erasure" button 237 for erasing a frame.

First Embodiment

Figure 8:
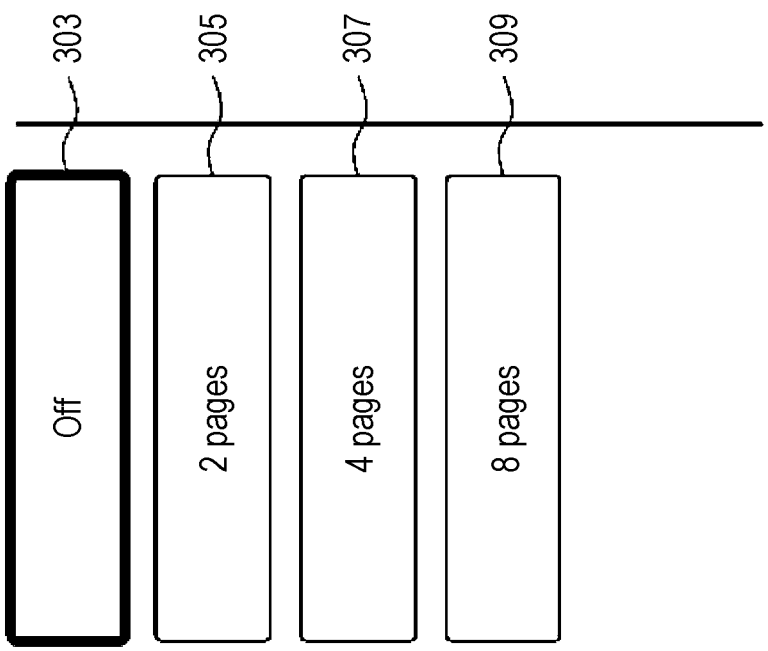
FIG. 8 is a diagram of a screen related to a page combination function displayed by a preview screen display apparatus of a first embodiment of the present disclosure.
Figure 9:
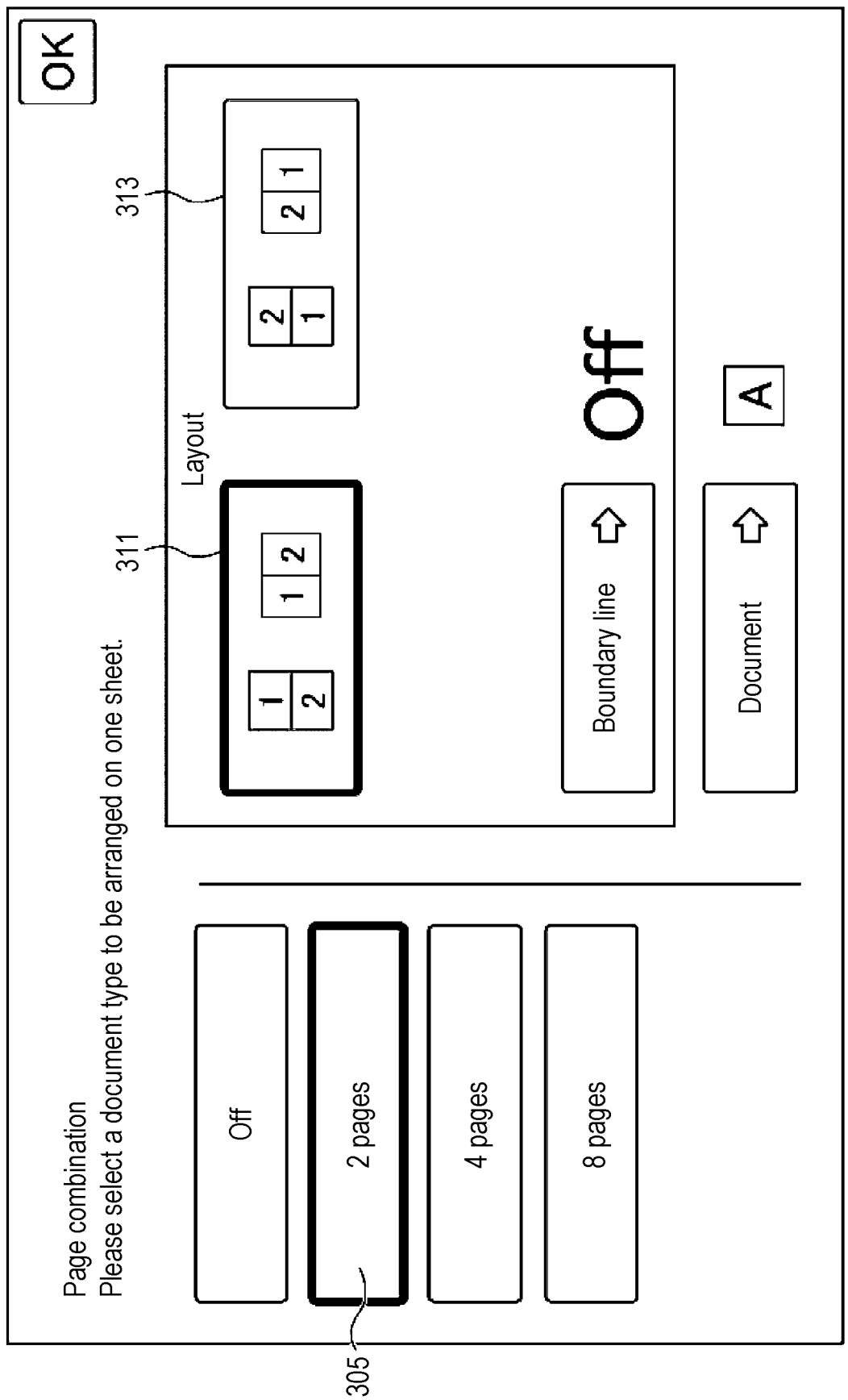
FIG. 9 is a diagram of another screen related to the page combination function displayed by the preview screen display apparatus of the first embodiment of the present disclosure.
Figure 10:
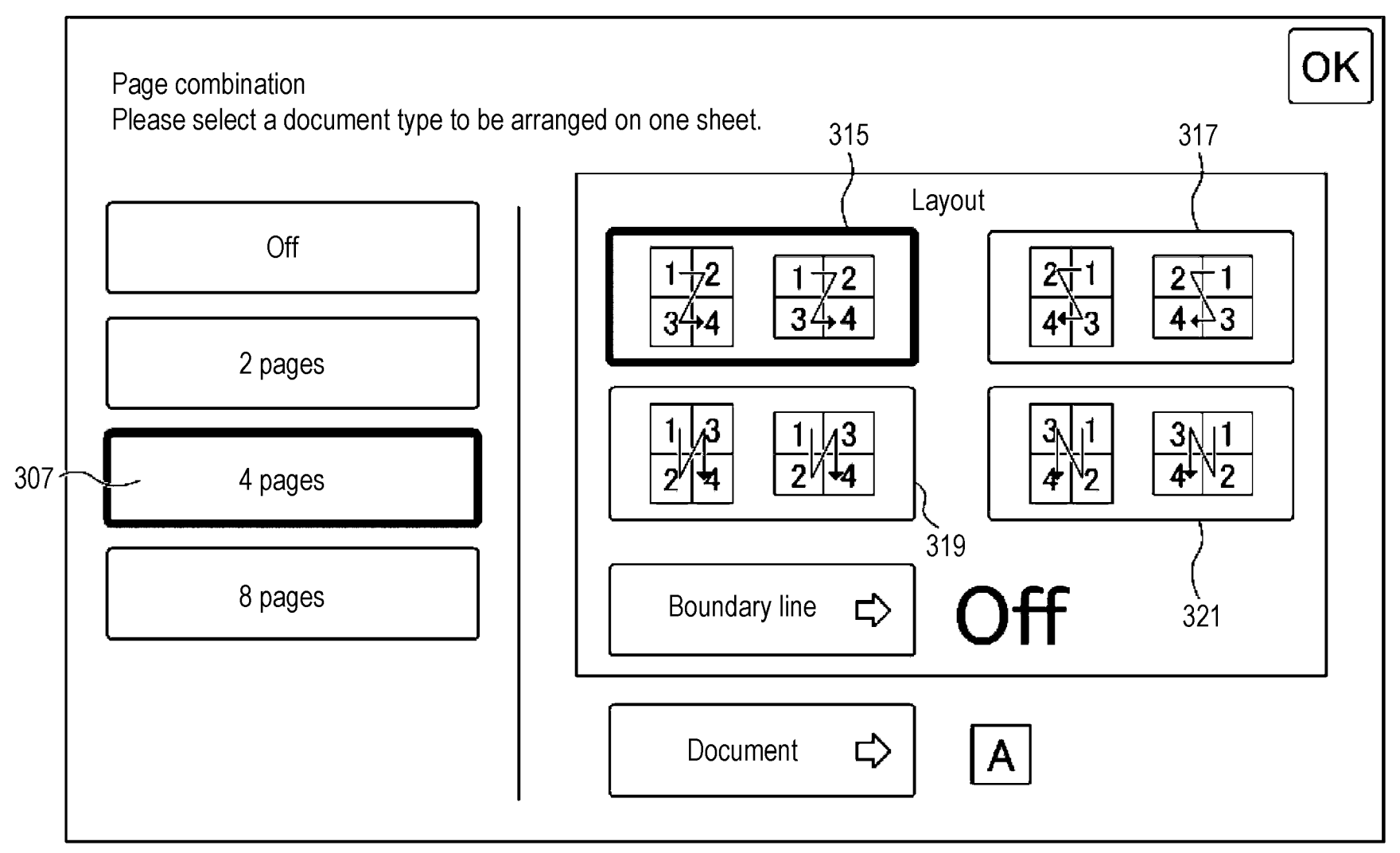
Figure 11:
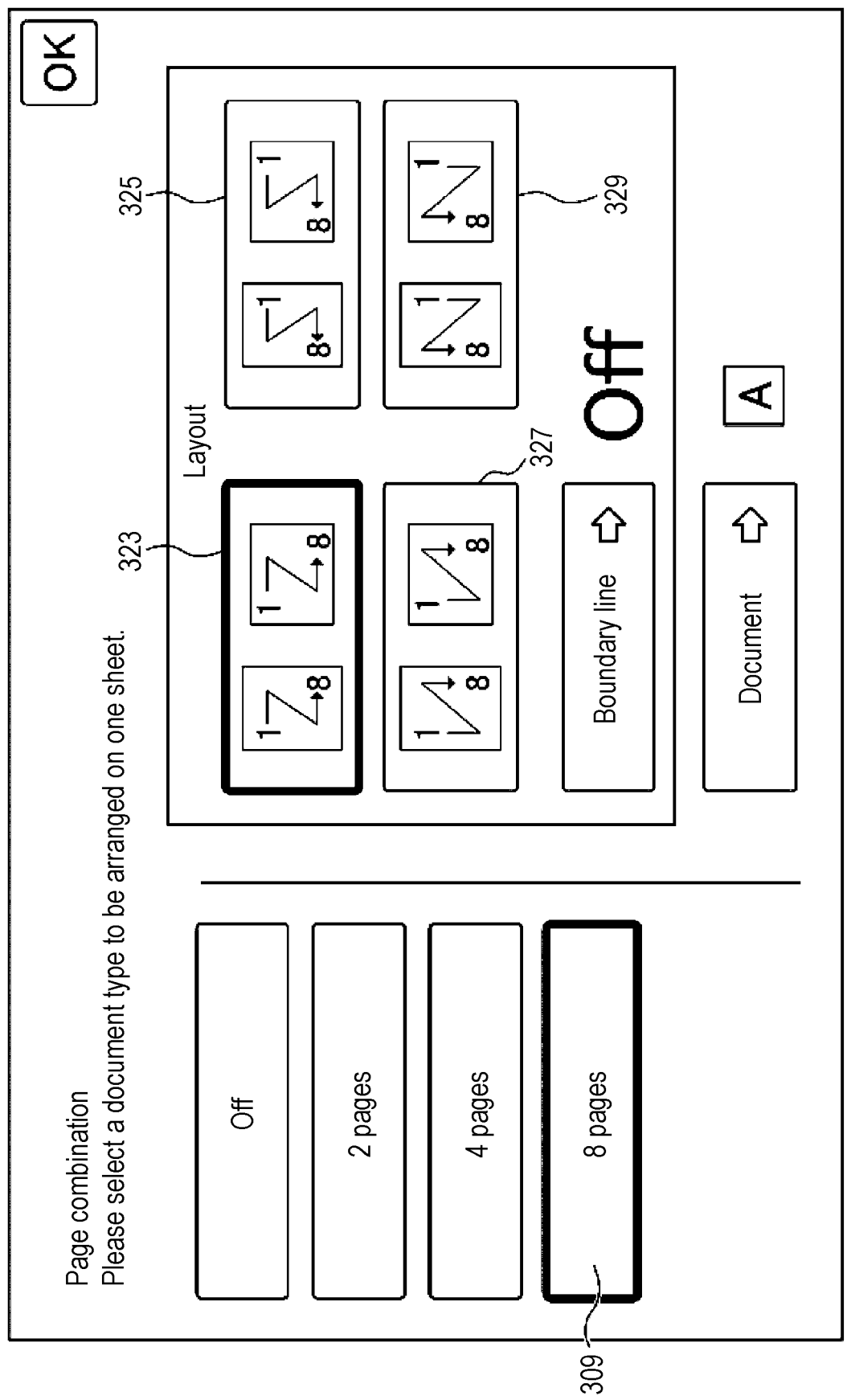
FIG. 11 is a diagram of yet another screen related to the page combination function displayed by the preview screen display apparatus of the first embodiment of the present disclosure.
Figure 12:
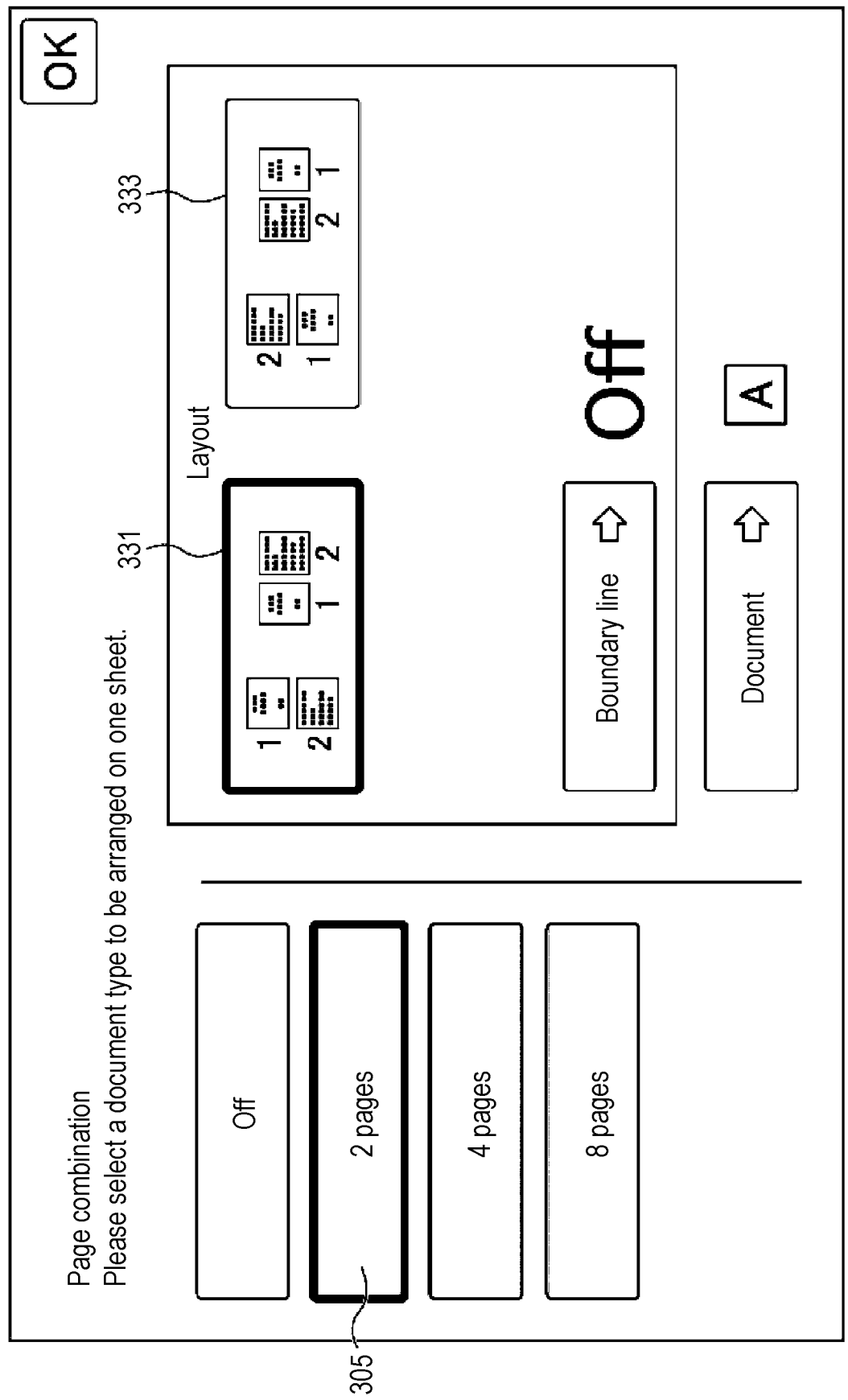
FIG. 12 is a diagram of yet another screen related to the page combination function displayed by the preview screen display apparatus of the first embodiment of the present disclosure.
Figure 13:
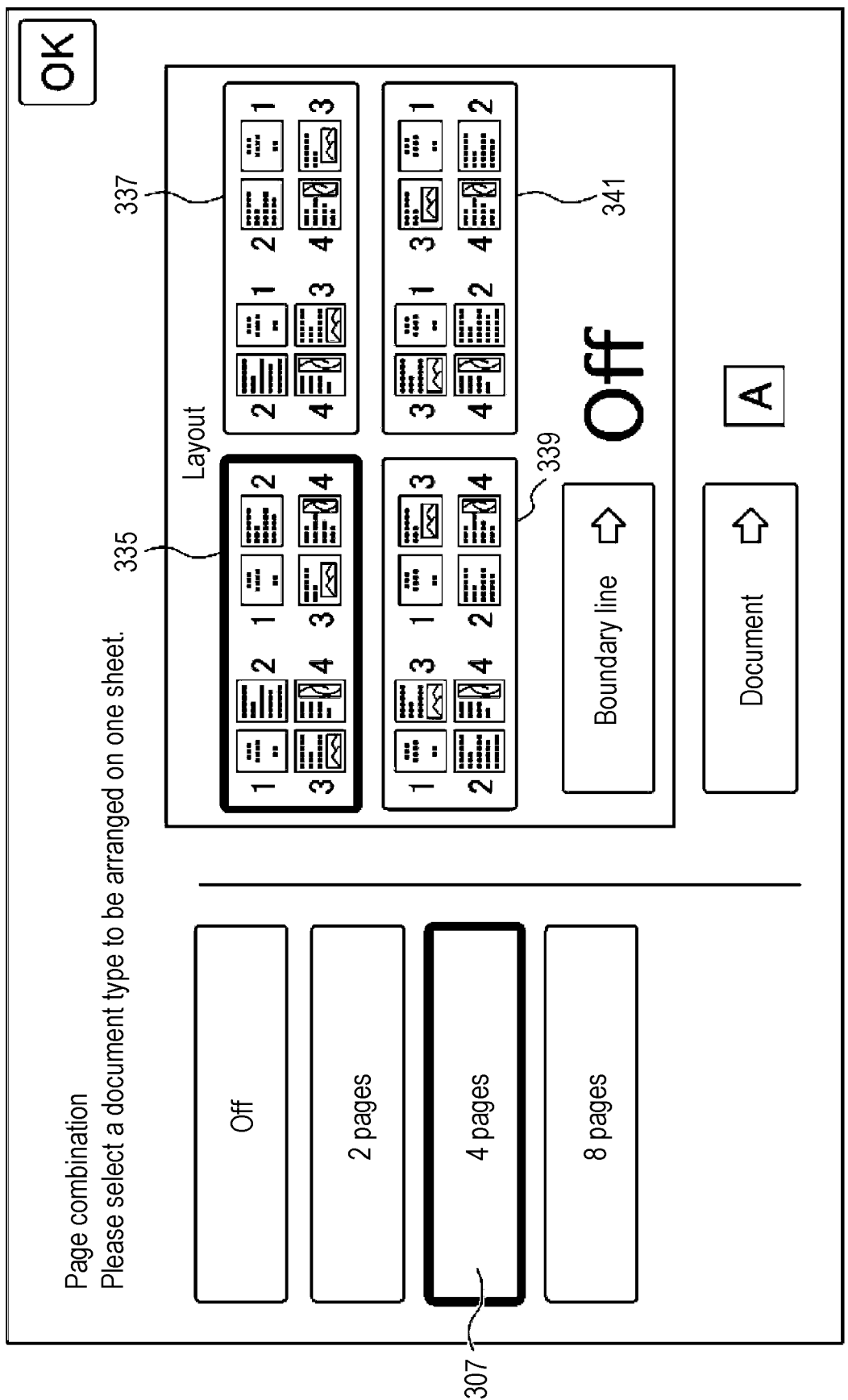
FIG. 13 is a diagram of yet another screen related to the page combination function displayed by the preview screen display apparatus of the first embodiment of the present disclosure.
Figure 14:
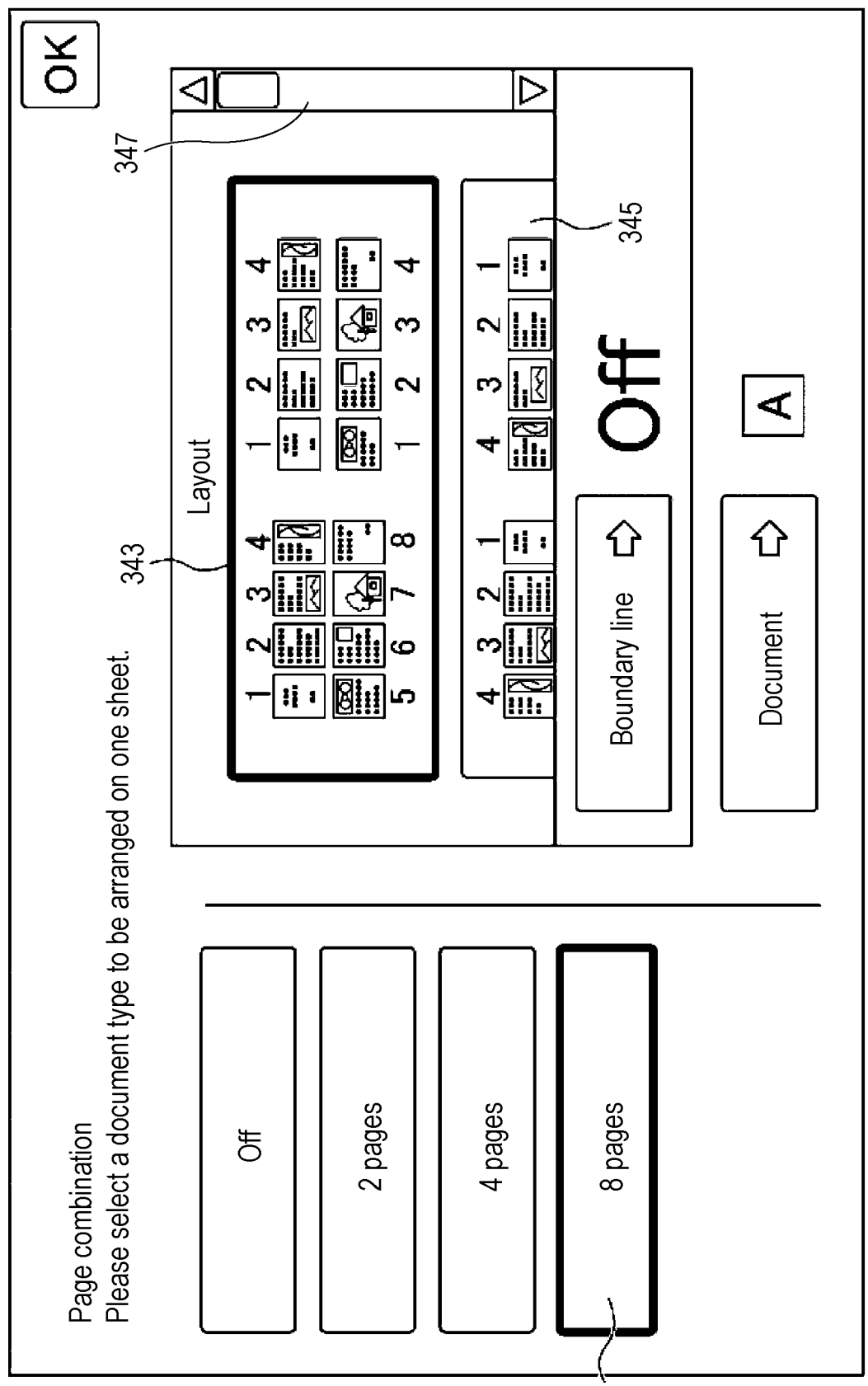
FIG. 14 is a diagram of yet another screen related to the page combination function displayed by the preview screen display apparatus of the first embodiment of the present disclosure.

When the "Page combination" button 233 is pressed, as depicted in FIG. 8, an initial screen including buttons 303, 305, 307, and 309 for selecting the number of sheets for page combination is displayed. On the initial screen of FIG. 8, the "Off" button 303 corresponding to no page combination has been selected. Here, a screen displayed if any of the other buttons 305, 307, and 309 is pressed and preview images have not been acquired yet is different from a screen displayed if any of the other buttons 305, 307, and 309 is pressed and preview images have already been acquired. That is, if any of the other buttons 305, 307, and 309 is pressed and preview images have not been acquired yet, a screen of FIG. 9, FIG. 10, or FIG. 11 is displayed depending on the number of sheets for page combination. If preview images have already been acquired, a screen of FIG. 12, FIG. 13, or FIG. 14 is displayed depending on the number of sheets for page combination.

If preview images have not been acquired yet, when the "2 pages" button 305 is selected, the screen becomes as depicted in FIG. 9. On the screen depicted in FIG. 9, a button 311 corresponding to a first arrangement sequence of sheets to be combined includes two icons each including two pages with numerals 1 and 2 indicating the first arrangement sequence, the icons corresponding to a layout in portrait orientation and a layout in landscape orientation. Also, a button 313 corresponding to a second arrangement sequence of sheets to be combined includes two icons each including two pages with numerals 1 and 2 indicating the second arrangement sequence, the icons corresponding to a layout in portrait orientation and a layout in landscape orientation. When either one of the buttons 311 and 313 is pressed, two-page combination printing is performed at the time of printing in the sequence corresponding to the pressed button.

If preview images have not been acquired yet, when the "4 pages" button 307 is selected, the screen becomes as depicted in FIG. 10. On the screen depicted in FIG. 10, a button 315 corresponding to a first arrangement sequence of sheets to be combined includes two icons each including four pages with numerals 1 to 4 indicating the first arrangement sequence, the icons corresponding to a layout in portrait orientation and a layout in landscape orientation. Also, a button 317 corresponding to a second arrangement sequence of sheets to be combined includes two icons each including four pages with numerals 1 to 4 indicating the second arrangement sequence, the icons corresponding to a layout in portrait orientation and a layout in landscape orientation. A button 319 corresponding to a third arrangement sequence of sheets to be combined and a button 321 corresponding to a fourth arrangement sequence of sheets to be combined are similar to the above, and therefore redundant description is omitted herein. When any of the buttons 315, 317, 319, and 321 is pressed, four-page combination printing is performed at the time of printing in the sequence corresponding to the pressed button.

If preview images have not been acquired yet, when the "8 pages" button 309 is selected, the screen becomes as depicted in FIG. 11. On the screen depicted in FIG. 11, a button 323 corresponding to a first arrangement sequence of sheets to be combined includes two icons in which arrangement positions of numerals 1 to 8 indicating the first arrangement sequence can be recognized, the icons corresponding to a layout in portrait orientation and a layout in landscape orientation. Also, a button 325 corresponding to a second arrangement sequence of sheets to be combined includes two icons in which arrangement positions of numerals 1 to 8 indicating the second arrangement sequence can be recognized, the icons corresponding to a layout in portrait orientation and a layout in landscape orientation. A button 327 corresponding to a third arrangement sequence of sheets to be combined and a button 329 corresponding to a fourth arrangement sequence of sheets to be combined are similar to the above, and therefore redundant description is omitted herein. When any of the buttons 323, 325, 327, and 329 is pressed, eight-page combination printing is performed at the time of printing in the sequence corresponding to the pressed button.

If preview images have already been acquired, when the "2 pages" button 305 is selected, the screen becomes as depicted in FIG. 12. On the screen depicted in FIG. 12, a button 331 corresponding to a first arrangement sequence of sheets to be combined includes two sets each including two preview images (small) aligned by following the first arrangement sequence, the sets corresponding to a layout in portrait orientation and a layout in landscape orientation. Also, a button 333 corresponding to a second arrangement sequence of sheets to be combined includes two sets each including two preview images (small) aligned by following the second arrangement sequence, the sets corresponding to a layout in portrait orientation and a layout in landscape orientation. When either one of the buttons 331 and 333 is pressed, two-page combination printing is performed at the time of printing in the sequence corresponding to the pressed button.

Therefore, the plurality of buttons corresponding to the plurality of different page arrangement sequences in the two-page combination function and including the preview images may be displayed on the same screen simultaneously at different positions.

If preview images have already been acquired, when the "4 pages" button 307 is selected, the screen becomes as depicted in FIG. 13. On the screen depicted in FIG. 13, a button 335 corresponding to a first arrangement sequence of sheets to be combined includes two sets each including four preview images (small) aligned by following the first arrangement sequence, the sets corresponding to a layout in portrait orientation and a layout in landscape orientation. Also, a button 337 corresponding to a second arrangement sequence of sheets to be combined includes two sets each including four preview images (small) aligned by following the second arrangement sequence, the sets corresponding to a layout in portrait orientation and a layout in landscape orientation. A button 339 corresponding to a third arrangement sequence of sheets to be combined and a button 341 corresponding to a fourth arrangement sequence of sheets to be combined are similar to the above, and therefore redundant description is omitted herein. When any of the buttons 335, 337, 339, and 341 is pressed, four-page combination printing is performed at the time of printing in the sequence corresponding to the pressed button.

Therefore, the plurality of buttons corresponding to the plurality of different page arrangement sequences in the four-page combination function and including the preview images may be displayed on the same screen simultaneously at different positions.

If preview images have already been acquired, when the "8 pages" button 309 is selected, the screen becomes as depicted in FIG. 14. On the screen depicted in FIG. 14, a button 343 corresponding to a first arrangement sequence of sheets to be combined includes two sets each including eight preview images (small) aligned by following the first arrangement sequence, the sets corresponding to a layout in portrait orientation and a layout in landscape orientation. Also, a button 345 corresponding to a second arrangement sequence of sheets to be combined includes two sets each including eight preview images (small) aligned by following the second arrangement sequence, the sets corresponding to a layout in portrait orientation and a layout in landscape orientation. Buttons corresponding to a third arrangement sequence of sheets to be combined onward, which are displayed by using a scroll bar 347 to scroll the screen, are similar to the buttons 343 and 345, and therefore redundant description is omitted herein. When any of the buttons 343, 345, and others is pressed, eight-page combination printing is performed at the time of printing in the sequence corresponding to the pressed button.

Therefore, the plurality of buttons corresponding to the plurality of different page arrangement sequences in the eight-page combination function and including the preview images may be displayed on the same screen simultaneously at different positions.

Second Embodiment

Figure 15:
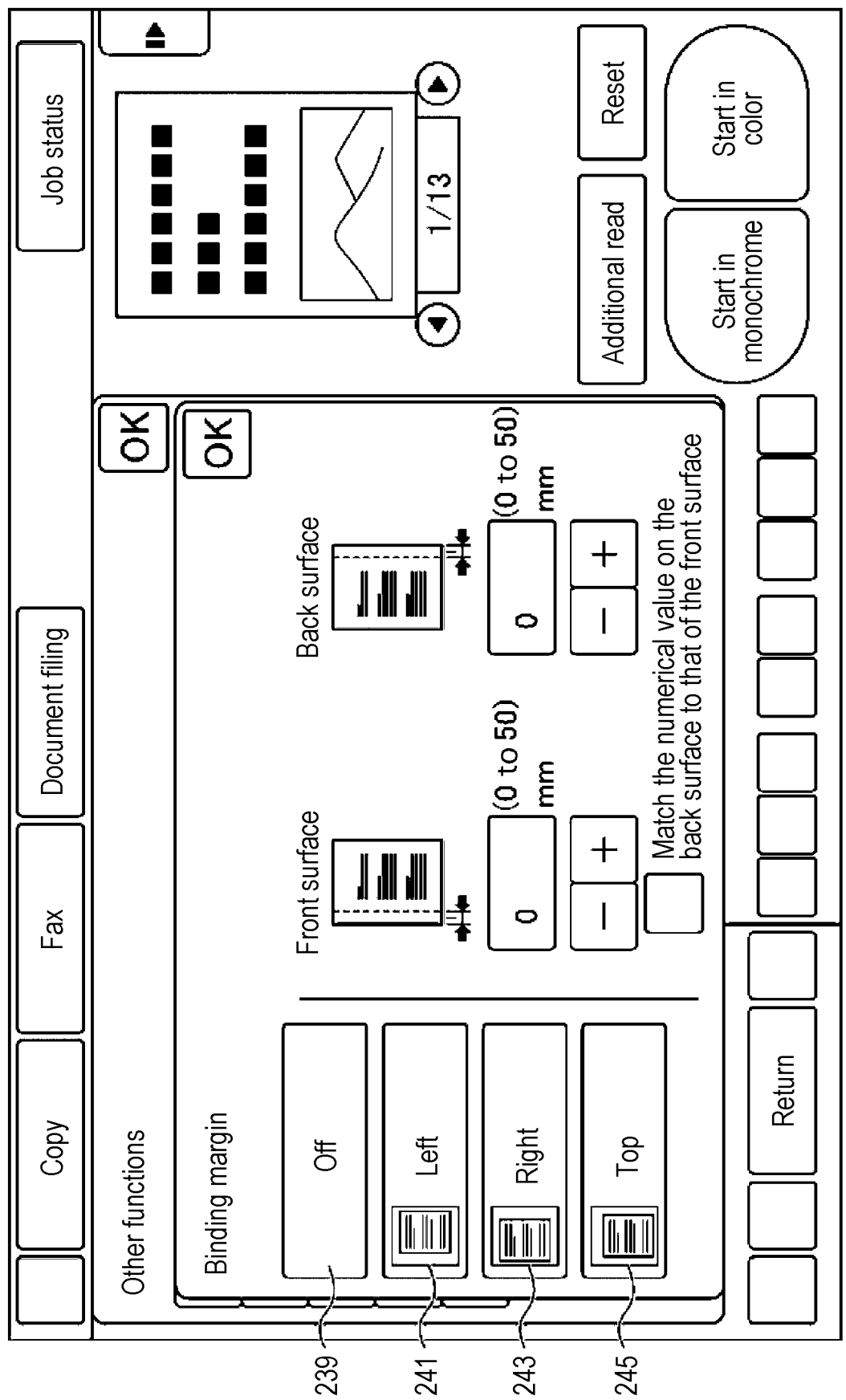
FIG. 15 is a diagram of a screen related to binding margin addition displayed by a preview screen display apparatus of a second embodiment of the present disclosure.

When the "Binding margin" button 235 is pressed on the screen depicted in FIG. 7, if preview images have not been acquired yet, a screen of FIG. 15 is displayed. If preview images have been acquired, a screen of FIG. 16 is displayed.

On the screen depicted in FIG. 15, an "Off" button 239 corresponding to binding margin off, a "Left" button 241 corresponding to a left binding margin, a "Right" button 243 corresponding to a right binding margin, and a "Top" button 245 corresponding to a top binding margin are displayed. The button 241, the button 243, and the button 245 each include an icon schematically depicting a page. A different icon is included for each button. The icon on the "Left" button 241 is provided with a blank portion on the left so as to correspond to the left binding margin, and a schematic page figure is arranged on the remaining portion. The icon on the "Right" button 243 is provided with a blank portion on the right so as to correspond to the right binding margin, and a schematic page figure is arranged on the remaining portion. The icon on the "Top" button 245 is provided with a blank portion on the top so as to correspond to the top binding margin, and a schematic page figure is arranged on the remaining portion.

Figure 16:
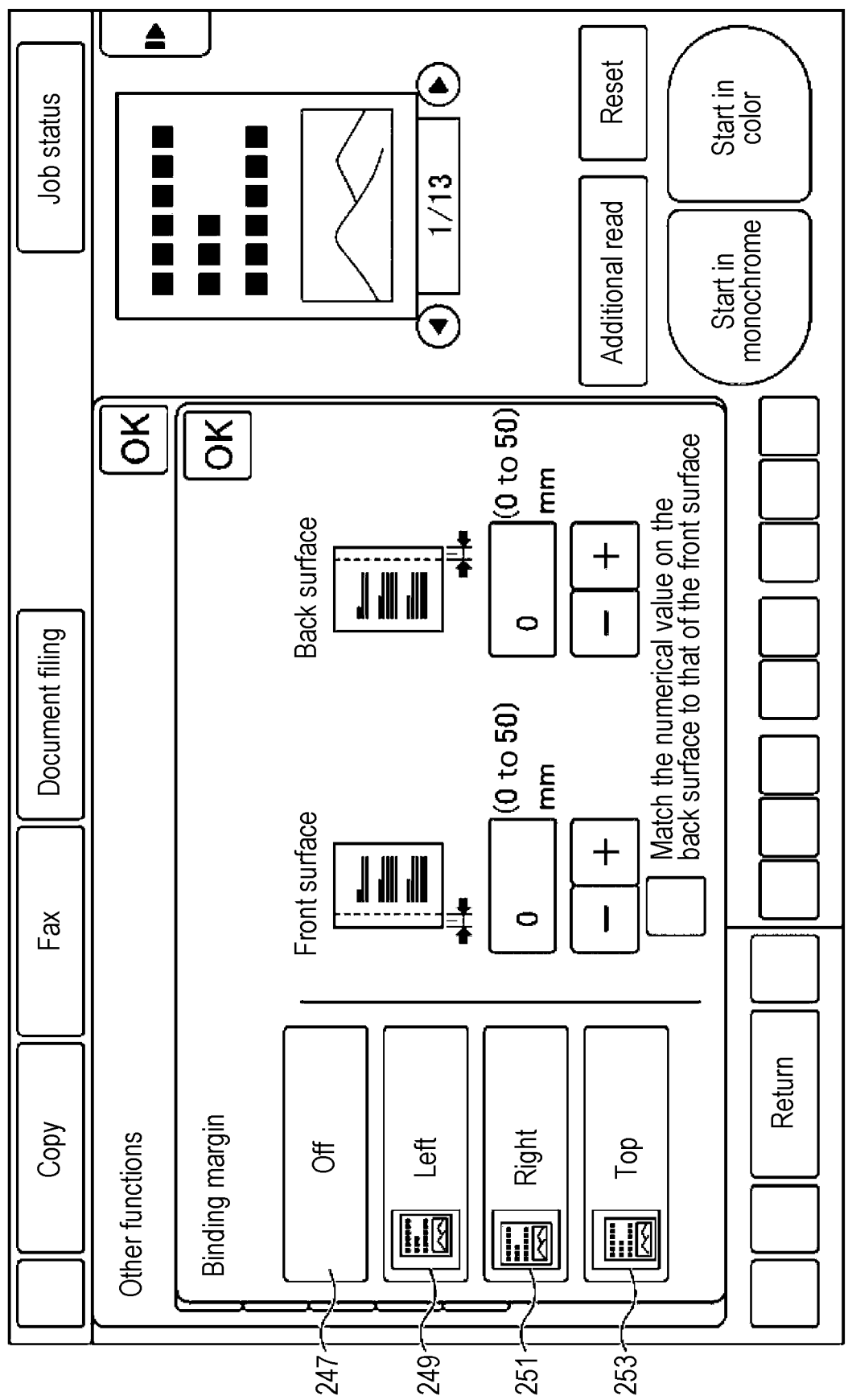
FIG. 16 is a diagram of another screen related to binding margin addition displayed by the preview screen display apparatus of the second embodiment of the present disclosure.

On the screen depicted in FIG. 16, an "Off" button 247 corresponding to binding margin off, a "Left" button 249 corresponding to a left binding margin, a "Right" button 251 corresponding to a right binding margin, and a "Top" button 253 corresponding to a top binding margin are displayed. The button 249, the button 251, and the button 253 each include an actual preview image.

The icon on the "Left" button 249 is provided with a blank portion on the left so as to correspond to the left binding margin, and the preview image is arranged on the remaining portion.

The icon on the "Right" button 251 is provided with a blank portion on the right so as to correspond to the right binding margin, and the preview image is arranged on the remaining portion.

The icon on the "Top" button 253 is provided with a blank portion on the top so as to correspond to the top binding margin, and the preview image is arranged on the remaining portion.

Therefore, the plurality of buttons corresponding to the plurality of different set positions of binding margins and including preview images are displayed simultaneously on the same screen at different positions.

Third Embodiment

Figure 17:
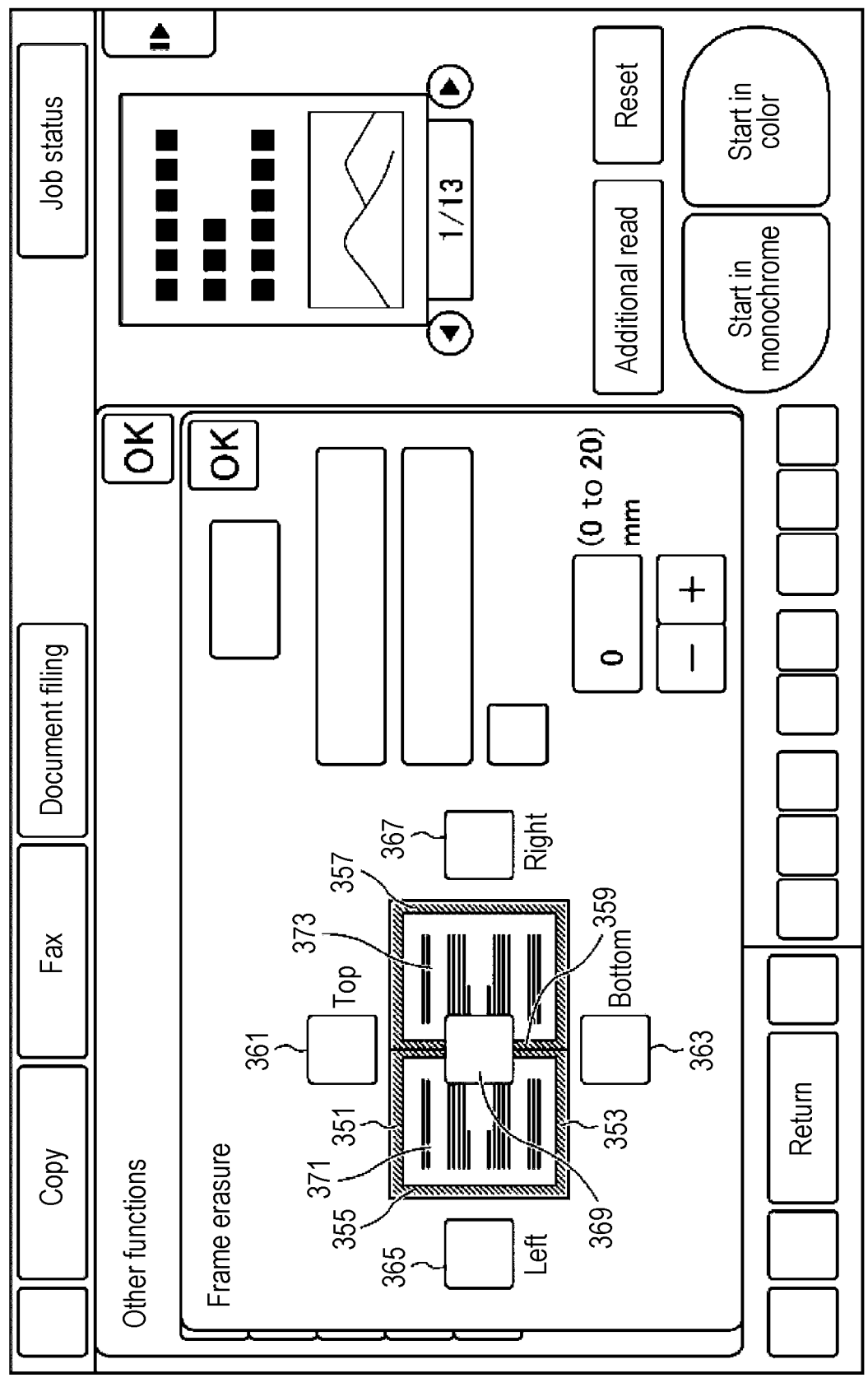
FIG. 17 is a diagram of a screen related to frame erasure displayed by a preview screen display apparatus of a third embodiment of the present disclosure.

When the "Frame erasure" button 237 is pressed on the screen depicted in FIG. 7, if preview images have not been acquired yet, a screen of FIG. 17 is displayed. If preview images have been acquired, a screen of FIG. 18 is displayed.

On the screen depicted in FIG. 17, frames 351, 353, 355, 357, an 359 corresponding to top, bottom, left, right, and center, respectively, are displayed in dark gray. Also, at center parts of a left page and a right page surrounded by these frames, FIGS. 371 and 373 schematically representing print details are provided.

Figure 18:
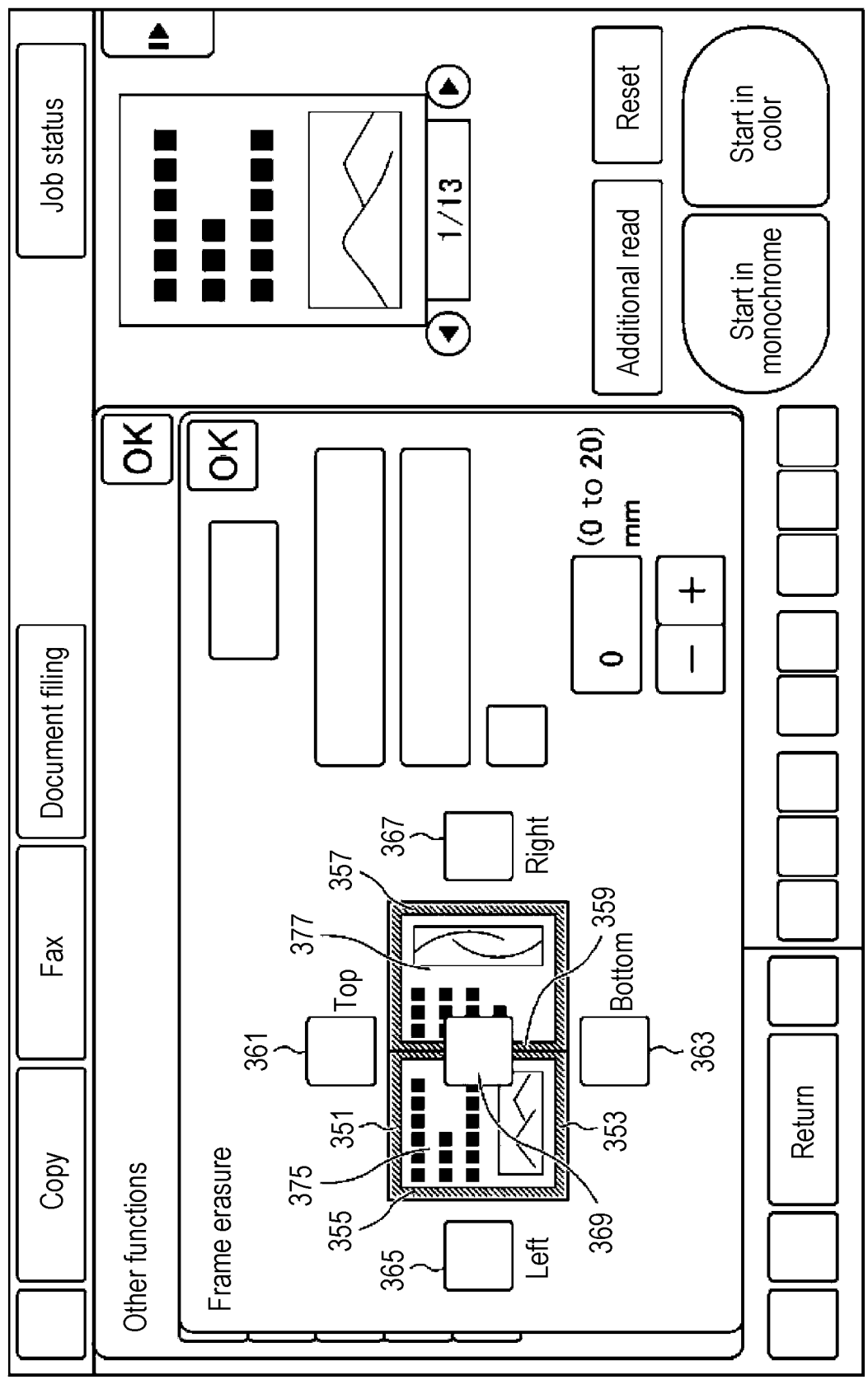
FIG. 18 is a diagram of another screen related to frame erasure displayed by the preview screen display apparatus of the third embodiment of the present disclosure.

On the screen depicted in FIG. 18, the frames 351, 353, 355, 357, an 359 corresponding to top, bottom, left, right, and center, respectively, are displayed in dark gray. Also, at center parts of a left page and a right page surrounded by these frames, actual preview screens 375 and 377 are inserted.

Figure 19:
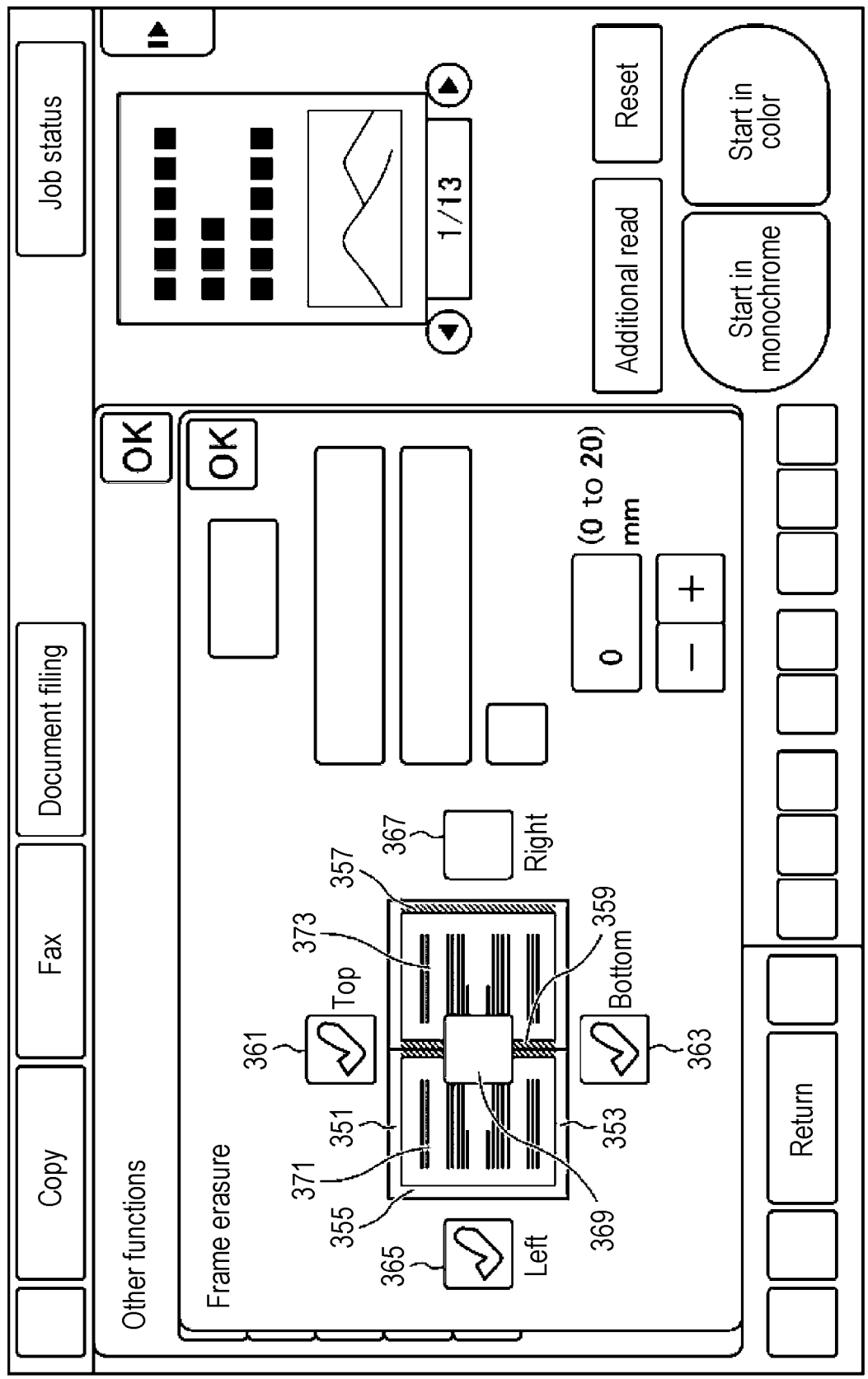
FIG. 19 is a diagram of still another screen related to frame erasure displayed by the preview screen display apparatus of the third embodiment of the present disclosure.

On the screen of FIG. 17, when check boxes 363, 365, and 361 are checked, the screen becomes as depicted in FIG. 19. On the screen depicted in FIG. 19, the color of the frames 353, 355, and 351 corresponding to the check boxes 363, 365, and 361 is changed from dark gray to white. This means that the frames have been erased.

Figure 20:
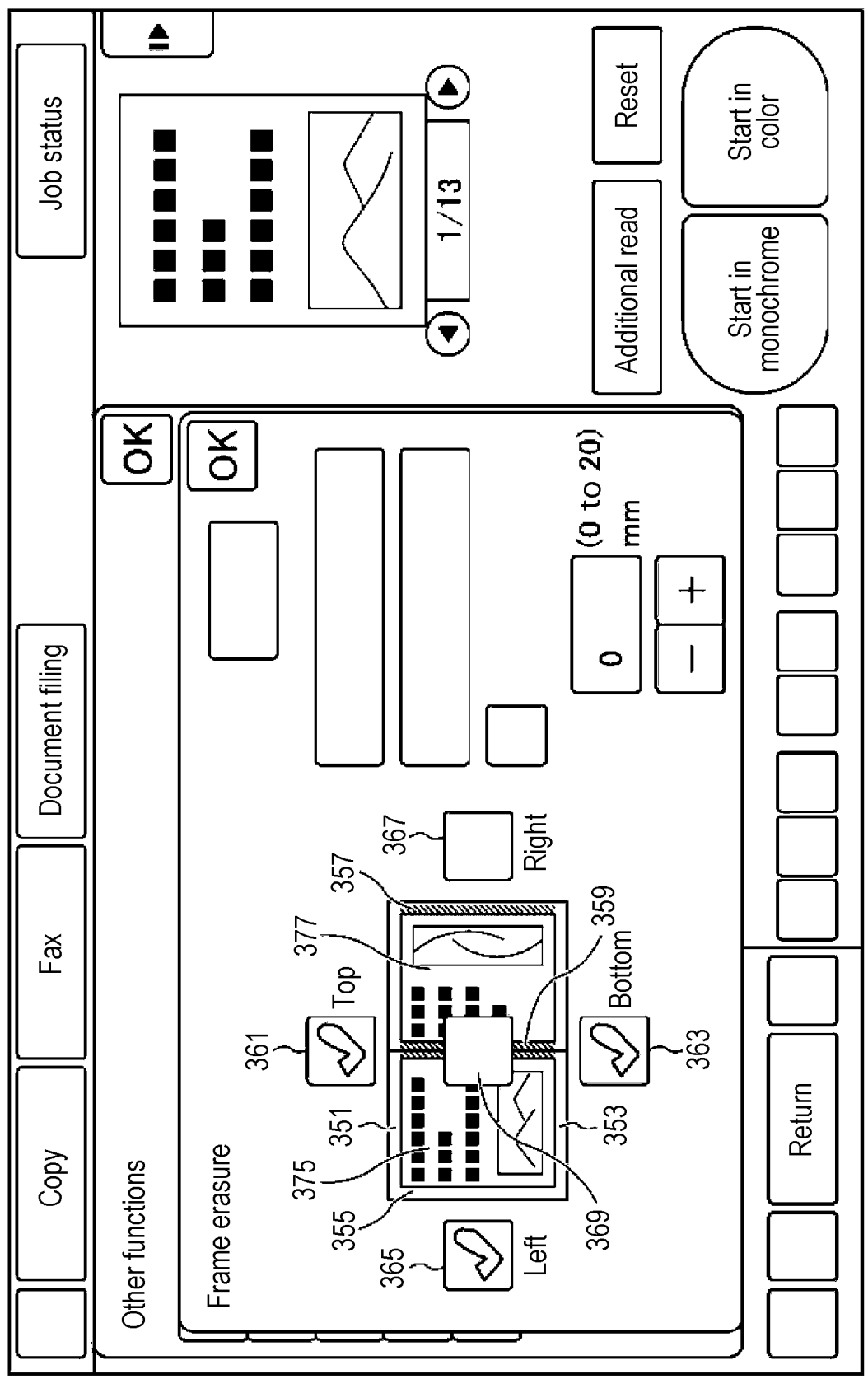
FIG. 20 is a diagram of yet another screen related to frame erasure displayed by the preview screen display apparatus of the third embodiment of the present disclosure.

On the screen of FIG. 18, when the check boxes 363, 365, and 361 are checked, the screen becomes as depicted in FIG. 20. On the screen depicted in FIG. 20, the color of the frames 353, 355, and 351 corresponding to the check boxes 363, 365, and 361 is changed from dark gray to white. On the screen in FIG. 20, this means that the frames have been erased.

Images including a plurality of frame figures corresponding to a plurality of different settings (corresponding to combinations of ON/OFF of erasure for each frame (the fifth power of 2=32 combinations)) in the frame erasure function and including preview images are displayed on the same screen at different times and the same position.

Figure 21:
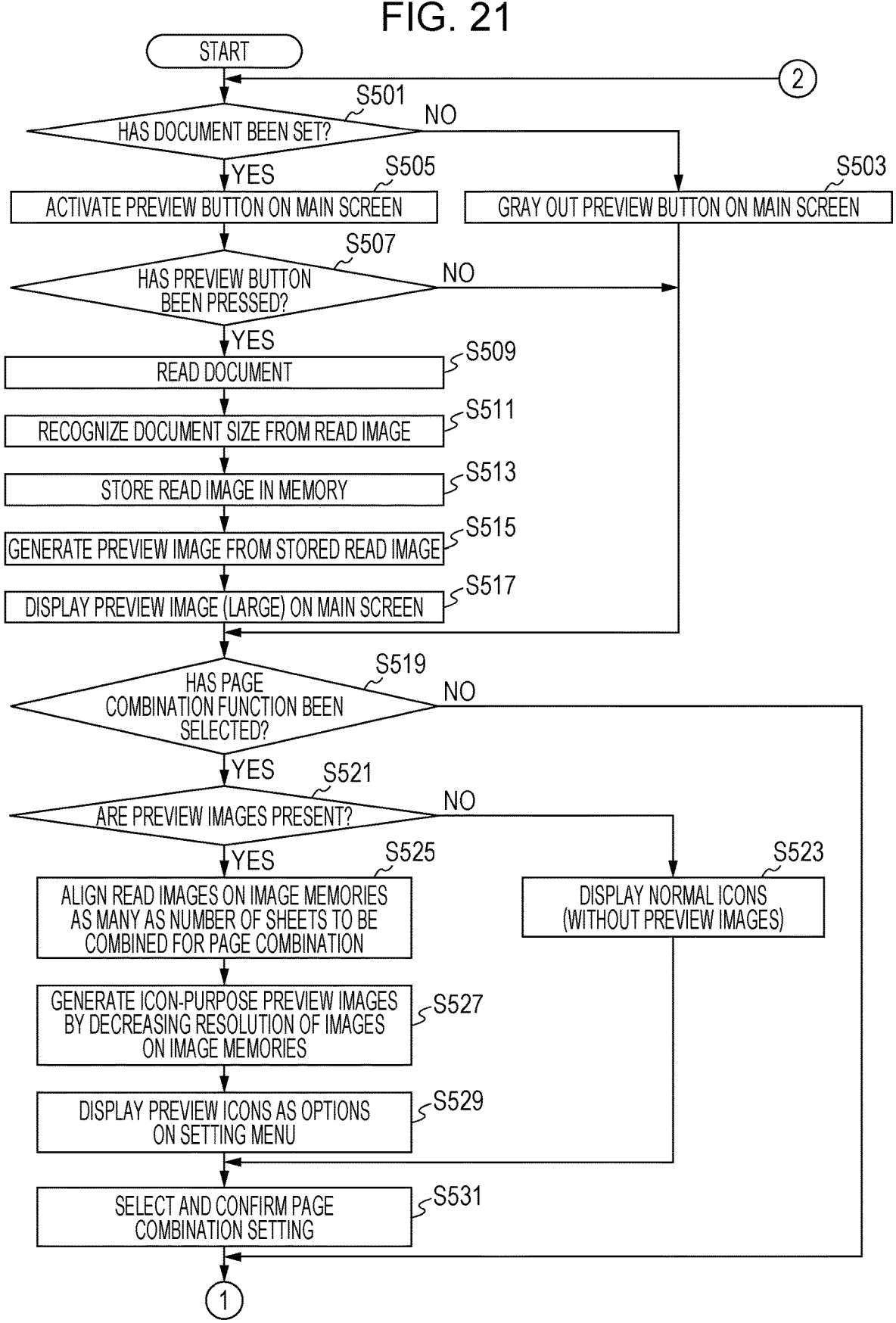
FIG. 21 is a former half of a flowchart for describing a preview screen display method of an embodiment of the present disclosure.
Figure 22:
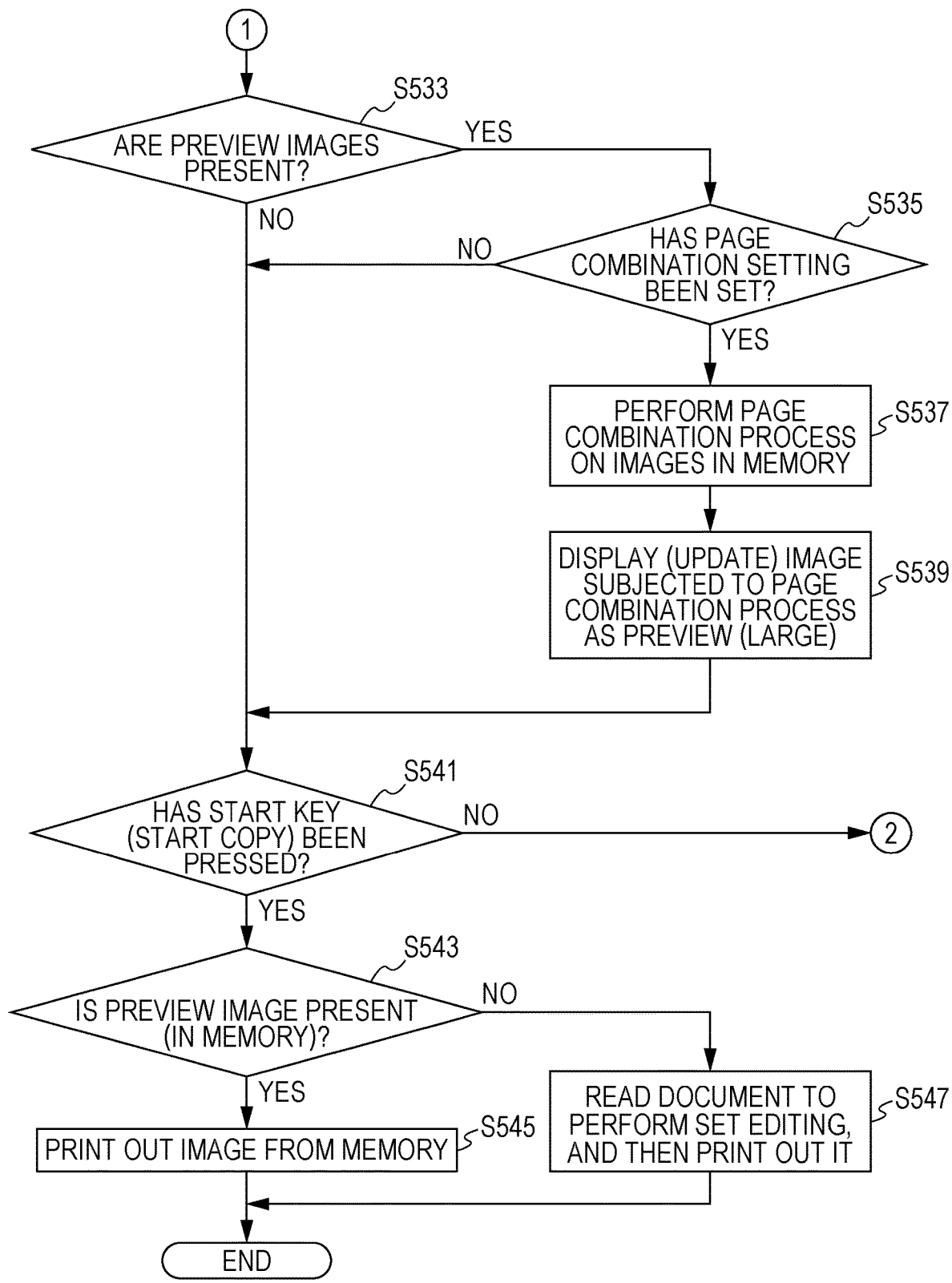
FIG. 22 is a latter half of the flowchart for describing the preview screen display method of the embodiment of the present disclosure.

Next, with reference to FIG. 21 and FIG. 22, a preview screen display method to be performed by the preview screen display apparatus of the present embodiment is described, by taking the page combination function as an example.

With reference to FIG. 21 and FIG. 22, firstly, it is determined whether a document has been set on the sheet loading unit 711 or the document automatic feeding unit 700 (step S501).

If a document has not been set (NO at step S501), the Preview button arranged on a main screen is grayed out to be disabled (step S503), and then the process proceeds to step S519.

If a document has been set (YES at step S501), the Preview button is activated to be enabled (step S505), and then the process proceeds to step S507.

At step S507, whether the Preview button has been pressed is determined. If the Preview button has not been pressed (NO at step S507), the process proceeds to step S519. If the Preview button has been pressed (YES at step S507), the process proceeds to step S509.

At step S509, the document is read. Next, a document size is recognized based on the read image (step S511). Next, the read image is stored in a memory (step S513). Next, a preview image is generated based on the read image stored in the memory (step S515). Next, a preview image (large) is displayed on the main screen (step S517).

At step S519, whether the page combination function has been selected is determined (step S519).

If the page combination function has not been selected (NO at step S519), the process proceeds to step S533.

If the page combination function has been selected (YES at step S519), it is first determined whether preview images are present in the memory (step S521). Here, if the Preview button has been pressed and steps S509, S511, S513, S515, and S517 have been performed, preview images are present.

If preview images are not present (NO at step S521), preview display objects are displayed by using not preview images but normal icons (step S523), and then the process proceeds to step S531.

If preview images are present (YES at step S521), the read images are aligned on image memories as many as the number of sheets to be combined for page combination (step S525). Next, by decreasing resolution of the images on the image memories, icon-purpose preview images are generated (step S527). Next, preview icons are displayed as options on the setting menu (step S529), and then the process proceeds to step S531.

At step S531, the page combination setting is selected and confirmed. That is, the page combination setting selected by the user among the options on the setting menu is confirmed. For example, in the case of two-page combination, when the button 311 (FIG. 9) for arranging the left page with higher priority than the right page in the case of alignment in landscape orientation and arranging the upper page with higher priority than the lower page in the case of alignment in portrait orientation is selected, this is confirmed. After confirmation, the process proceeds to step S533.

At step S533, whether preview images are present is determined. Here, if the Preview button has been pressed and steps S509, S511, S513, S515, and S517 have been performed, preview images are present.

If preview images are not present (NO at step S533), the process proceeds to step S541.

If preview images are present (YES at step S533), whether the page combination setting has been set is determined (step S535). Here, if the page combination function has been selected at step S519 and selection of the page combination setting has been confirmed at step S531, the determination result at step S535 is positive.

If it is determined at step S535 that the page combination setting has been set, page combination process is performed on the images stored in the memory (step S537), the images subjected to the page combination process are displayed as a new preview image (large) (step S539), and then the process proceeds to step S541.

If it is determined at step S535 that the page combination setting has not been set, the process proceeds to step S541.

At step S541, whether any Start key has been pressed is determined.

If any Start key has not been pressed (NO at step S541), the process returns to step S501.

If any Start key has been pressed (YES at step S541), whether a preview image is present is determined (step S543). Here, a preview image is present if the Preview button has been pressed and steps S509, S511, S513, S515, and S517 have been performed.

If a preview image is present (YES at step S543), an image is read from the memory and printing is performed based on the image (step S545).

If a preview image is not present (NO at step S543), a document is newly read, set editing is performed, and then printing is performed (step S547).

Next, an example of operation is described.

If the user does not set a document, no document can be read. Therefore, the process proceeds from step S501 via step S503 to step S519. If the user does not set a document and selects the page combination function (YES at step S519), preview images are not present (NO at step S521), and therefore the page combination function is displayed by using display objects without preview images (step S523). A page combination setting is confirmed (step S531) but preview images are not present (NO at step S533), and the process proceeds to step S541 of determining whether any Start key has been pressed. If any Start key has not been pressed, the process returns to step S501.

If the user neither sets a document nor selects the page combination function (NO at step S519), the process proceeds to step S533. Then, preview images are not present (NO at step S533), and the process proceeds to step S541 of determining whether any Start key has been pressed. If any Start key has not been pressed, the process returns to step S501.

[Document Not Set State: Start Key]

If the user neither sets a document nor selects the page combination function but presses any Start key (NO at step S501→step S503→NO at step S519→NO at step S533→YES at step S541), preview images are not present (NO at step S543), and therefore the process proceeds to step S547. At this step, a document is newly read, and printing process is performed without page combination.

[Document Not Set State: Page Combination Key, Start Key]

If the user does not set a document, selects the page combination function, and presses any Start key (NO at step S501→step S503→YES at step S519→NO at step S521→step S523→step S531→NO at step S533→YES at step S541), preview images are not present (NO at step S543), and therefore the process proceeds to step S547. At this step, a document is newly read, and printing process is performed with page combination.

If the user neither sets a document, nor selects the page combination function, nor presses any Start key, the process repeats the following (repeat A):

NO at step S501
→step S503
→NO at step S519
→NO at step S533
→NO at step S541
→NO at step S501.

If the user sets a document at some point, YES is determined at step S501, and the Preview button on the main screen is changed from a grayed out state to an active state (step S505). Here, if the Preview button has not been pressed (NO at step S507), the process proceeds to step S519. Here, if it is determined that the page combination function is not selected (NO at step S519), the process proceeds to step S533. However, the Preview button has not been pressed, and preview images are not present, and therefore NO is determined at step S533, and the process proceeds to step S541. Here, if any Start key is not pressed, NO is determined at step S541, and the process returns to step S501. This is repeated, with a document being set. That is, the process repeats the following (repeat B):

YES at step S501
→step S505
→NO at step S507
→NO at step S519
→NO at step S533
→NO at step S541
→YES at step S501.

[Document Set State: Start Key]

If any Start key is pressed at some point in the repeat B, YES is determined at step S541, and NO is determined at step S543. At step S547, a document is read and printing is performed based on the document.

[Document Set State: Preview Button, Start Key]

If the Preview button is pressed at some point in the repeat B, YES is determined at step S507, and steps S509, S511, S513, S515, and S517 are performed to acquire a preview screen. Then, when any Start key is pressed, YES is determined at step S541, and YES is determined at step S543. By performing step S545, printing is performed by using the images acquired by preview.

[Document Set State: Page Combination Key, Start Key]

If the page combination function is selected at some point in the repeat B, YES is determined at step S519. When the process proceeds to step S521, if preview images have not been acquired yet, NO is determined at step S521. Every time the number of sheets to be combined is selected (refer to FIG. 8), a plurality of page arrangement sequences corresponding to the number of sheets to be combined for each printing sheet are displayed by using display objects including normal icons (refer to FIG. 9, FIG. 10, and FIG. 11). Then, when any Start key is pressed, YES is determined at step S541, and NO is determined at step S543. At step S547, a document is read and printing is preformed based on the document.

[Document Set State: Preview Button, Page Combination Key, Start Key]

If the Preview button is pressed at some point in the repeat B, YES is determined at step S507, and steps S509, S511, S513, S515, and S517 are performed to acquire a preview screen. Then, when the page combination function is selected, YES is determined at step S519. When the process proceeds to step S521, since the preview images have been acquired, YES is determined at step S521. Every time the number of sheets to be combined is selected (refer to FIG. 8), a plurality of page arrangement sequences corresponding to the number of sheets to be combined for each printing sheet are displayed by using display objects including the preview images (refer to FIG. 12, FIG. 13, and FIG. 14). Then, when any Start key is pressed, YES is determined at step S541, and YES is determined at step S543. By performing step S545, printing is performed by using the images acquiring the preview.

Next, a multi-function printer including the preview screen display apparatus according to the embodiments of the present disclosure is described with reference to FIG. 23.

Figure 23:
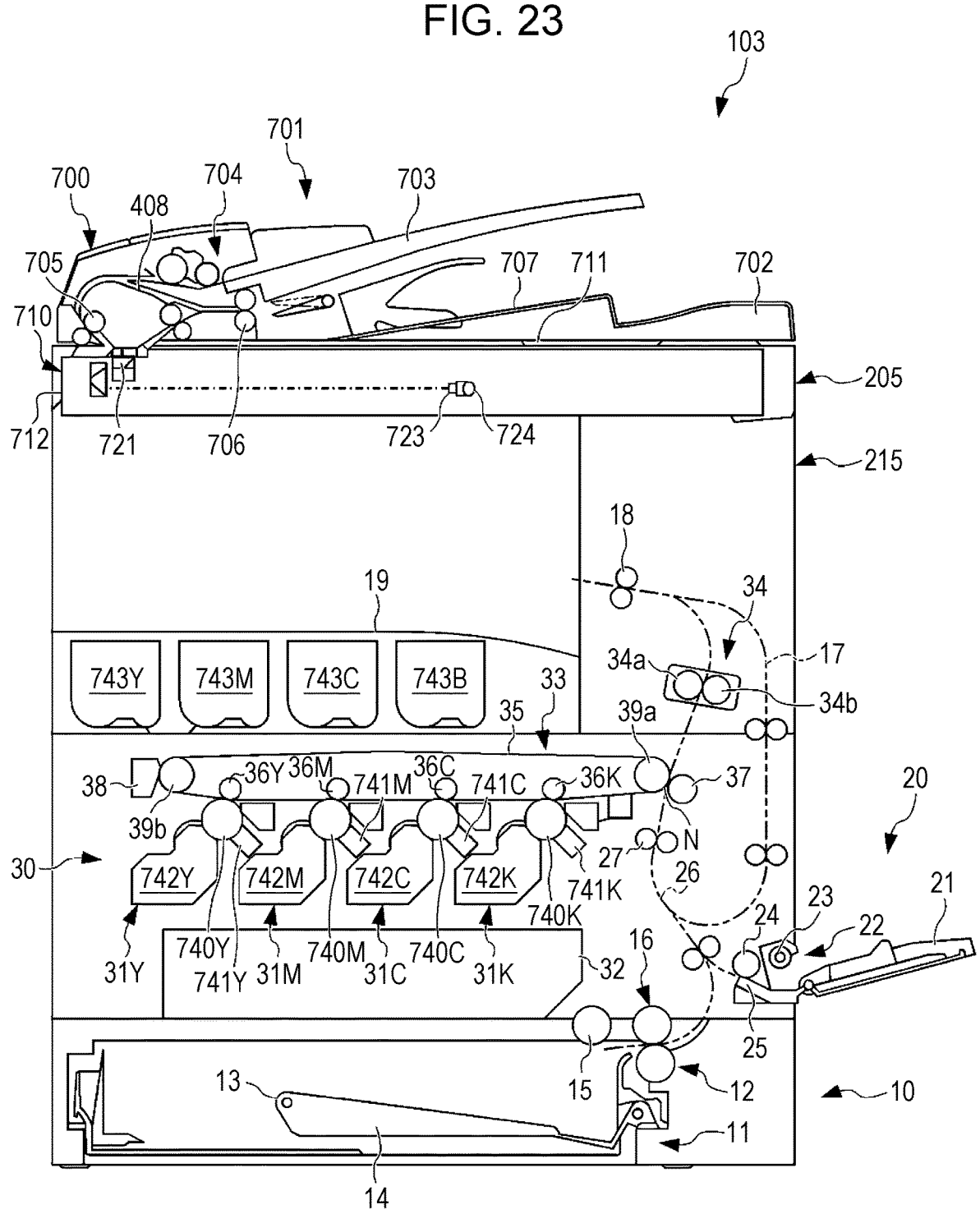
FIG. 23 is a conceptual diagram of the structure of the multi-function printer of the embodiment of the present disclosure.

As depicted in FIG. 23, a multi-function printer 103 includes an image reading unit 205 which reads an image of a document, a multi-function printer main body (print processing unit) 215 which forms an image on a sheet, the operation panel unit 217 for operating the image reading unit 205 and the print processing unit 215, and the arithmetic processing unit 213 which controls the image reading unit 205 and the print processing unit 215 based on the operation accepted by the operation panel unit 217. The input unit 203 and the display unit 211 configure part of the operation panel unit 217.

The image reading unit 205 can be singly used for image reading, and the print processing unit 215 can be singly used for image formation. In addition, these units can also be used in conjunction with each other for image copying. Furthermore, the multi-function printer 103 may include a storage apparatus and/or facsimile apparatus not depicted. The storage apparatus can store an image read by the image reading apparatus and an image received by the facsimile apparatus. The facsimile apparatus can transmit the image read by the image reading apparatus and the image stored in the storage apparatus and receive an image from outside. Furthermore, the multi-function printer 103 may include an interface for connection to a personal computer via a network. The personal computer connected to the multi-function printer 103 can use functions of the multi-function printer 103 for data that can be managed by the personal computer.

The image reading unit 205 includes a document automatic feeding unit (single pass feeder (SPF)) 700 which automatically feeds a document and a reading apparatus main body 710 which reads an image of the document.

The print processing unit 215 includes a sheet feeding unit 10 which feeds a sheet, a manual feeding unit 20 which can manually feed a sheet, and an image forming unit 30 which forms an image on the sheet fed by the sheet feeding unit 10 or the manual feeding unit 20. As described above, the print setting function selection unit 207 and the display object generation unit 209 may be included in the arithmetic processing unit 213.

The sheet feeding unit 10 includes a sheet loading unit 11 where sheets are loaded and a sheet-separating feeding unit 12 which separately feeds the sheets loaded on the sheet loading unit 11 one by one. The sheet loading unit 11 includes an intermediate plate 14 which rotates about a rotating shaft 13. The intermediate plate 14 rotates when feeding a sheet to lift the sheet upward. The sheet-separating feeding unit 12 includes a pickup roller 15 which feeds a sheet lifted by the intermediate plate 14 and paired separation rollers 16 which separate sheets fed by the pickup roller 15 one by one.

The manual feeding unit 20 includes a manual feeding tray 21 where sheets can be loaded and a sheet-separating feeding unit 22 which separately feeds the sheets loaded on the manual feeding tray 21 one by one. The manual feeding tray 21 is rotatably supported to the print processing unit 215. At manual feeding, the manual feeding tray 21 is fixed at a predetermined angle, thereby allowing sheets to be loaded thereon. The sheet-separating feeding unit 22 includes a pickup roller 23 which feeds the sheets loaded on the manual feeding tray 21 and a separation roller 24 and a separation pad 25 which separate the sheets fed by the pickup roller 23 one by one.

The image forming unit 30 includes: four process cartridges 31Y to 31K which form images in yellow (Y), magenta (M), cyan (C), and black (K); photosensitive drums 740Y to 740K, which will be described further below; an exposure apparatus 32 which exposes the surfaces of these drums; a transfer unit 33 which transfers toner images formed on the surfaces of the photosensitive drums 740Y to 740K to a sheet; and a fusing unit 34 which fuses the transferred toner images onto the sheet. Note that alphabets (Y, M, C, and K) suffixed to reference numerals represent the respective colors (yellow, magenta, cyan, and black).

The four process cartridges 31Y to 31K are each configured so as to be removable from the print processing unit 215 for replacement. Note that since the four process cartridges 31Y to 31K are similarly configured except that colors of images to be formed are different, only the structure of the process cartridge 31Y which forms an image in yellow (Y) is described and description of the process cartridges 31M to 31K is omitted herein.

The process cartridge 31Y includes the photosensitive drum 740Y as an image carrier, a charger 741Y which charges the photosensitive drum 740Y, a developing apparatus 742Y which develops an electrostatic latent image formed on the photosensitive drum 740Y, and a drum cleaner which removes toner left on the surface of the photosensitive drum 740Y. The developing apparatus 742Y includes a developing apparatus main body (not depicted in detail) which performs development on the photosensitive drum 740Y and a toner cartridge (not depicted in detail) which supplies toner to the developing apparatus main body. The toner cartridge is configured so as to be attachable to and detachable from the developing apparatus main body and, when running out of accommodated toner, can be removed from the developing apparatus main body for replacement.

The exposure apparatus 32 includes a light source (not depicted) which radiates laser beams, a plurality of mirrors (not depicted) which guide the laser beams to the photosensitive drums 740Y to 740K, and so forth. The transfer unit 33 includes an intermediate transfer belt 35 which carries toner images formed on the photosensitive drums 740Y to 740K, primary transfer rollers 36Y to 36K which perform primary transfer of the toner images formed on the photosensitive drums 740Y to 740K to the intermediate transfer belt 35, a secondary transfer roller 37 which performs secondary transfer of the toner images transferred to the intermediate transfer belt 35 to a sheet, and a belt cleaner 38 which removes toner left on the intermediate transfer belt 35. The intermediate transfer belt 35 is put over a drive roller 39a and a driven roller 39b, and is pressed onto the photosensitive drums 740Y to 740K by the primary transfer rollers 36Y to 36K. The secondary transfer roller 37 and the drive roller 39a nip (interpose) the intermediate transfer belt 35 therebetween, and the toner images carried by the intermediate transfer belt 35 are transferred to the sheet at a nip part N. The fusing unit 34 includes a heat roller 34a which heats the sheet and a pressure roller 34b which makes pressure contact with the heat roller 34a.

The operation panel unit 217 includes the display unit 211 which displays predetermined information and the input unit 203 for the user to input an instruction to the image reading unit 205 and the print processing unit 215. In the present embodiment, the operation panel unit 217 is disposed on a front side of the reading apparatus main body 710. Note that the front side corresponds to a front side of the sheet of FIG. 23 and a rear side corresponds to a back side of FIG. 23.

As depicted in FIG. 2, the arithmetic processing unit 213 includes a CPU 213a which drives and controls the sheet feeding unit 10, the manual feeding unit 20, the image forming unit 30, and the image reading unit 205. The CPU 213a reads and executes a program stored in a memory 213b, thereby achieving the above-mentioned control. Based on the operation on the operation panel unit 217 by the user, the arithmetic processing unit 213 controls the operation of the sheet feeding unit 10, the manual feeding unit 20, the image forming unit 30, and the image reading unit 205 in a unified manner to cause an image to be formed on a sheet.

Next, image formation operation (image formation control by the arithmetic processing unit 213) by the above-structured multi-function printer 103 is described. In the present embodiment, by way of example, image forming operation is described in which an image of a readout document fed by the document automatic feeding unit 700 and read by the reading apparatus main body 710 is formed by the image forming unit 30 on a sheet fed by the sheet feeding unit 10.

When an image formation start signal is issued upon input by the user to the input unit 203 of the operation panel unit 217, a readout document placed by the user on the document automatic feeding unit 700 is automatically fed toward a document reading position, and an image is read by the reading apparatus main body 710 at the document reading position.

When the image of the document is read out by the reading apparatus main body 710, based on image information of the read document, the exposure apparatus 32 radiates, toward the photosensitive drums 740Y to 740K, a plurality of laser beams respectively corresponding thereto. Here, the photosensitive drums 740Y to 740K are respectively charged in advance by the chargers 741Y to 741K. With the corresponding laser beams radiated to the photosensitive drums 740Y to 740K, electrostatic latent images are respectively formed on the photosensitive drums 740Y to 740K. Then, the electrostatic latent images respectively formed on the photosensitive drums 740Y to 740K are developed by the developing apparatuses 742Y to 742K, and toner images in yellow (Y), magenta (M), cyan (C), and black (K) are formed on the photosensitive drums 740Y to 740K. The toner images of the respective colors formed on the photosensitive drums 740Y to 740K are transferred and superposed by the primary transfer rollers 36Y to 36K to the intermediate transfer belt 35. The transferred and superposed toner images (full-colored toner images) are conveyed to the nip part N as being carried on the intermediate transfer belt 35.

Concurrently with the above-described image forming operation, as being separated by the sheet-separating feeding unit 12 one by one, the sheets loaded on the seat loading unit 11 are fed by the pickup roller 15 to a sheet conveyor path 26. Then, skew is corrected by paired resist rollers 27 positioned upstream of the nip part N in a sheet conveying direction, and the sheet is conveyed to the nip part N at predetermined conveyance timing. To the sheet conveyed to the nip part N, a full-colored toner image carried on the intermediate transfer belt 35 is transferred by the secondary transfer roller 37.

On the sheet with the toner image transferred thereto, the toner image is melted and fused by heating and pressurizing at the fusing unit 34, and the sheet is then discharged outside the apparatus by paired discharge rollers 18. The sheet discharged outside the apparatus is loaded on a discharge sheet loading unit 19.

Note that when images are formed on both surfaces (first and second surfaces) of a sheet, before the sheet having an image formed on the first surface is discharged outside the apparatus, the paired discharge rollers 18 are rotated in reverse to convey the sheet to a double-sided conveyor path 17, and then the sheet is conveyed again to the image forming unit 30 via the double-sided conveyor path 17. Then, as with the first surface, an image is formed on the second surface, and the sheet is discharged outside the apparatus. The sheet discharged outside the apparatus is loaded on the discharge sheet loading unit 19.

Note that the above-described preview screen display apparatus can be achieved by hardware, software, or a combination thereof. Also, a preview screen display method to be performed by the above-described preview screen display apparatus can be achieved by hardware, software, or a combination thereof. Here, achievement by software means achievement by a computer reading and executing a program.

The program is stored by using any of non-transitory computer readable media of various types, and can be supplied to the computer. The non-transitory computer readable media include tangible storage media of various types. Examples of the non-transitory computer readable media include a magnetic recording medium (for example, flexible disc, magnetic tape, and hard disk drive), magneto-optical recording medium (for example, magneto-optical disc), CD-ROM (read only memory), CD-R, CD-R/W, and semiconductor memory (for example, mask ROM, programmable ROM (PROM), erasable PROM (EPROM), flash ROM, and random access memory (RAM)). Also, the program may be supplied to the computer by any of transitory computer readable media of various types. Examples of the transitory computer readable media include an electrical signal, optical signal, and electromagnetic waves. The transitory computer readable media can supply the program to the computer via a wired communication channel such as an electric wire or optical fiber or a wireless communication channel.

The present disclosure contains subject matter related to that disclosed in Japanese Priority Patent Application JP 2016-129779 filed in the Japan Patent Office on Jun. 30, 2016, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A preview screen display apparatus for displaying a preview screen for printing, the preview screen display apparatus comprising:
a processor that selects a print setting function in accordance with an input from a user;
a scanner that acquires at least one of preview images of documents in preparation of printing at least one of the documents; and
a display that displays, on a screen, a plurality of buttons respectively corresponding to a plurality of different set values related to the selected print setting function in preparation of the printing of the at least one of the documents; wherein
the at least one of preview images is arranged on each of the plurality of buttons differently from how the at least one of preview images is arranged on the other of the plurality of buttons;
a set value among the plurality of different set values is selected when a corresponding one of the plurality of buttons is selected;
the display performs simultaneous display of the plurality of buttons respectively corresponding to the plurality of different set values and each including the at least one of preview images on a same screen regarding the print setting function selected by the processor;
when the processor selects the print setting function, if the scanner has already read the at least one of preview images, the display performs the simultaneous display of the plurality of buttons respectively corresponding to the plurality of different set values and each including the at least one of preview images on the same screen regarding the print setting function selected by the processor; and
when the processor selects the print setting function, if the scanner has not read the at least one of preview images yet, the display performs simultaneous display of a plurality of buttons respectively corresponding to the plurality of different set values and not including any of the at least one of preview images on the same screen regarding the print setting function selected by the processor.

2. The preview screen display apparatus according to claim 1, wherein
the display displays the plurality of buttons at different positions when performing the simultaneous display.

3. The preview screen display apparatus according to claim 1, wherein
the print setting function is one of a page combination function and a binding margin addition function.

4. The preview screen display apparatus according to claim 3, wherein
when the print setting function is the page combination function, the plurality of different set values are a plurality of different page arrangement sequences for a same number of pages on a paper regarding the page combination function,
when the print setting function is the binding margin addition function, the plurality of different set values are a plurality of set positions in which a binding margin is to be added.

5. A multi-function printer comprising the preview screen display apparatus according to claim 1.

6. A non-transitory computer-readable medium including a preview screen display program causing a computer to function as the preview screen display apparatus according to claim 1.

7. The preview screen display apparatus according to claim 1, wherein
the at least one of preview images are common among the plurality of buttons including the at least one of preview images and are displayed on one of the plurality of buttons in a manner corresponding to the set value assigned to the one of the plurality of buttons.

8. A preview screen display method for displaying a preview screen for printing, the preview screen display method comprising:
- selecting a print setting function in accordance with an input from a user;
- reading at least one of preview images of documents in preparation of printing at least one of the documents; and
- performing display, on a screen, of a plurality of buttons respectively corresponding to a plurality of different set values related to the selected print setting function in preparation of the printing of the at least one of the documents; wherein
- the at least one of preview images is arranged on each of the plurality of buttons differently from how the at least one of preview images is arranged on the other of the plurality of buttons;
- a set value among the plurality of different set values is selected when a corresponding one of the plurality of buttons is selected;
- the plurality of buttons respectively corresponding to the plurality of different set values and each including the at least one of preview images are simultaneously displayed on a same screen regarding the selected print setting function;
- when the print setting function is selected, if the at least one of preview images has already been read, the simultaneous display of the plurality of buttons respectively corresponding to the plurality of different set values and each including the at least one of preview images is performed on the same screen regarding the selected print setting function; and
- when the print setting function is selected, if the at least one of preview images has not yet been read, the simultaneous display of a plurality of buttons respectively corresponding to the plurality of different set values and not including any of the at least one of preview images is performed on the same screen regarding the selected print setting function.

* * * * *